US011502362B2

(12) United States Patent
Searles

(10) Patent No.: US 11,502,362 B2
(45) Date of Patent: Nov. 15, 2022

(54) BATTERY HOLDER

(71) Applicant: Mark Aubrey Searles, Hampshire (GB)

(72) Inventor: Mark Aubrey Searles, Hampshire (GB)

(*) Notice: Subject to any disclaimer, the term of this patent is extended or adjusted under 35 U.S.C. 154(b) by 325 days.

(21) Appl. No.: 16/725,032

(22) Filed: Dec. 23, 2019

(65) Prior Publication Data
US 2020/0220133 A1 Jul. 9, 2020

(30) Foreign Application Priority Data
Jan. 3, 2019 (GB) .................................... 1900069

(51) Int. Cl.
*H01M 50/20* (2021.01)
*B62J 43/20* (2020.01)
*B62J 43/13* (2020.01)
*H01M 50/244* (2021.01)
*B62M 6/90* (2010.01)

(52) U.S. Cl.
CPC ............ *H01M 50/20* (2021.01); *B62J 43/13* (2020.02); *B62J 43/20* (2020.02); *H01M 50/244* (2021.01); *B62M 6/90* (2013.01); *H01M 2220/20* (2013.01)

(58) Field of Classification Search
CPC ...... H01M 50/20; H01M 50/244; B62J 43/13; B62J 43/20
See application file for complete search history.

(56) References Cited

U.S. PATENT DOCUMENTS

| 2,588,870 | A | * | 3/1952 | Pittman | ............... B60R 16/04 |
| | | | | | 180/68.5 |
| 2015/0114734 | A1 | * | 4/2015 | Ogawa | ............... B62M 6/90 |
| | | | | | 180/68.5 |
| 2015/0158551 | A1 | | 6/2015 | Ogawa | |
| 2015/0266543 | A1 | | 9/2015 | Marioni | |
| 2016/0056432 | A1 | | 2/2016 | Searles | |

FOREIGN PATENT DOCUMENTS

EP          2 657 119 A1    10/2013

OTHER PUBLICATIONS

British Search Report for corresponding British Patent Application No. GB 1900069.4 dated Jan. 21, 2019.

* cited by examiner

*Primary Examiner* — Jonathan G Jelsma
(74) *Attorney, Agent, or Firm* — Renner, Otto, Boisselle & Sklar, LLP

(57) ABSTRACT

A battery holder 54 for fitting a battery pack 52 to a frame 4 of a cycle 2 comprises a spine portion 100 for fixing to the frame 4; a connector portion 110 to form an electrical connection between the battery pack and wiring; and a battery moving portion 115 for moving the battery pack 52 towards the connector portion to engage the battery pack with the connector portion. A lever mechanism 120 actuates sliding of the battery moving portion 115 in a linear direction between an open state providing clearance for insertion/removal of the battery pack and an engaged state for engagement of the battery pack 54 and connector portion 110. The lever mechanism 120 has a retained state which provides resistance to removal of the battery pack from the battery holder. This provides a simple to install and fasten holder which securely holds the battery pack.

20 Claims, 15 Drawing Sheets

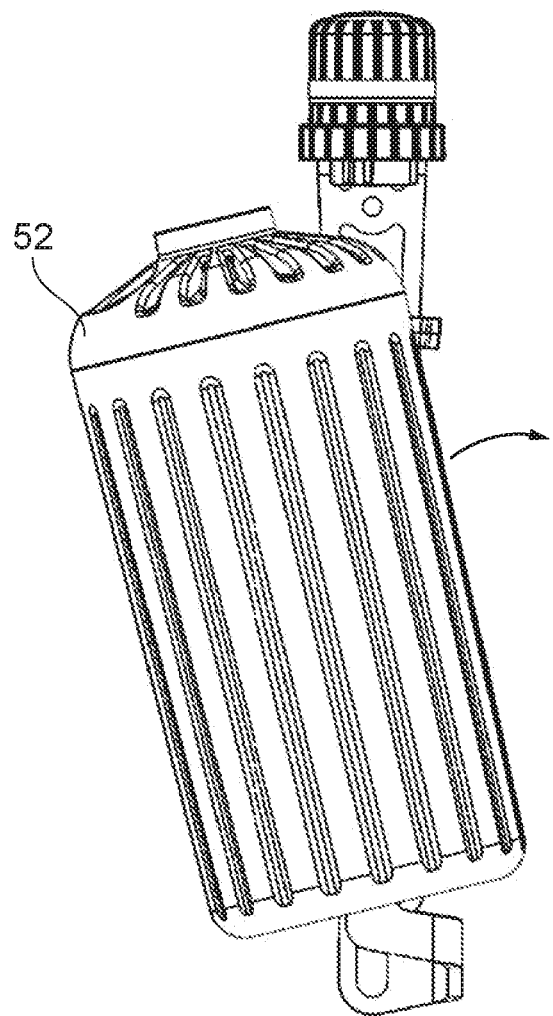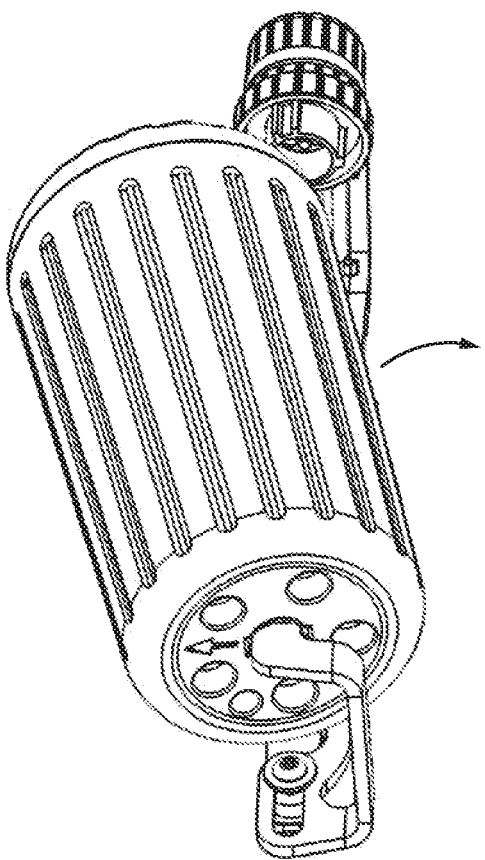
FIG. 10
FIG. 11

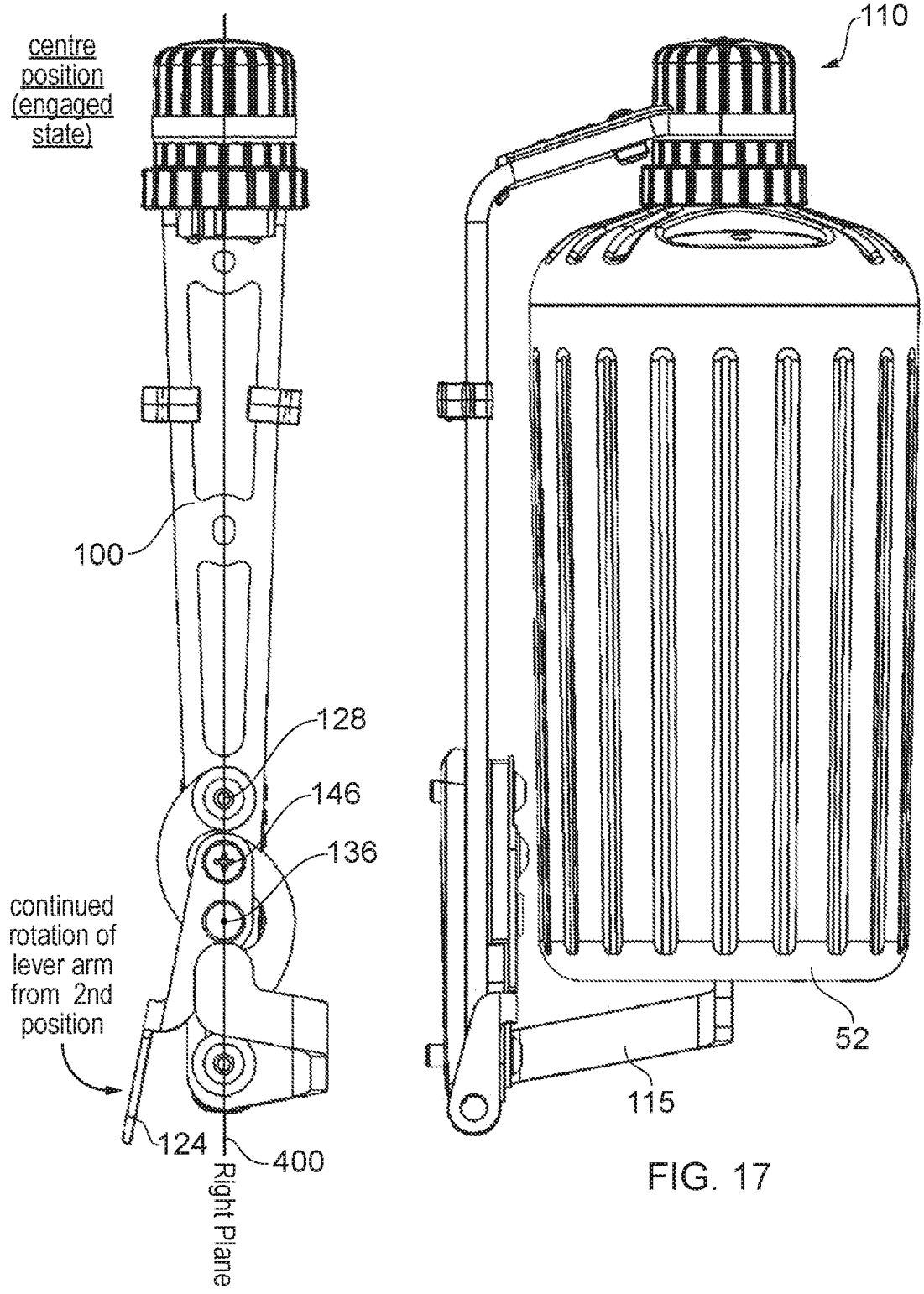

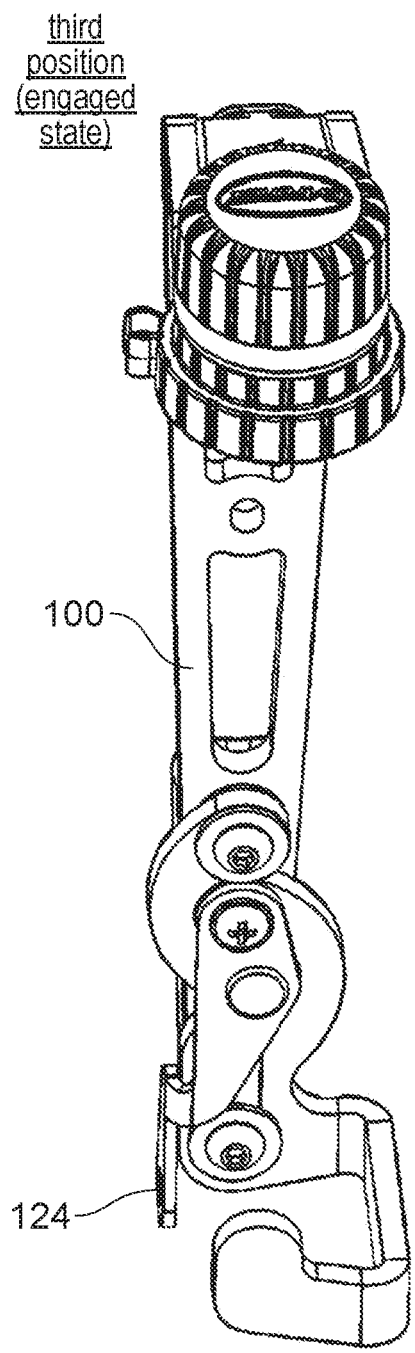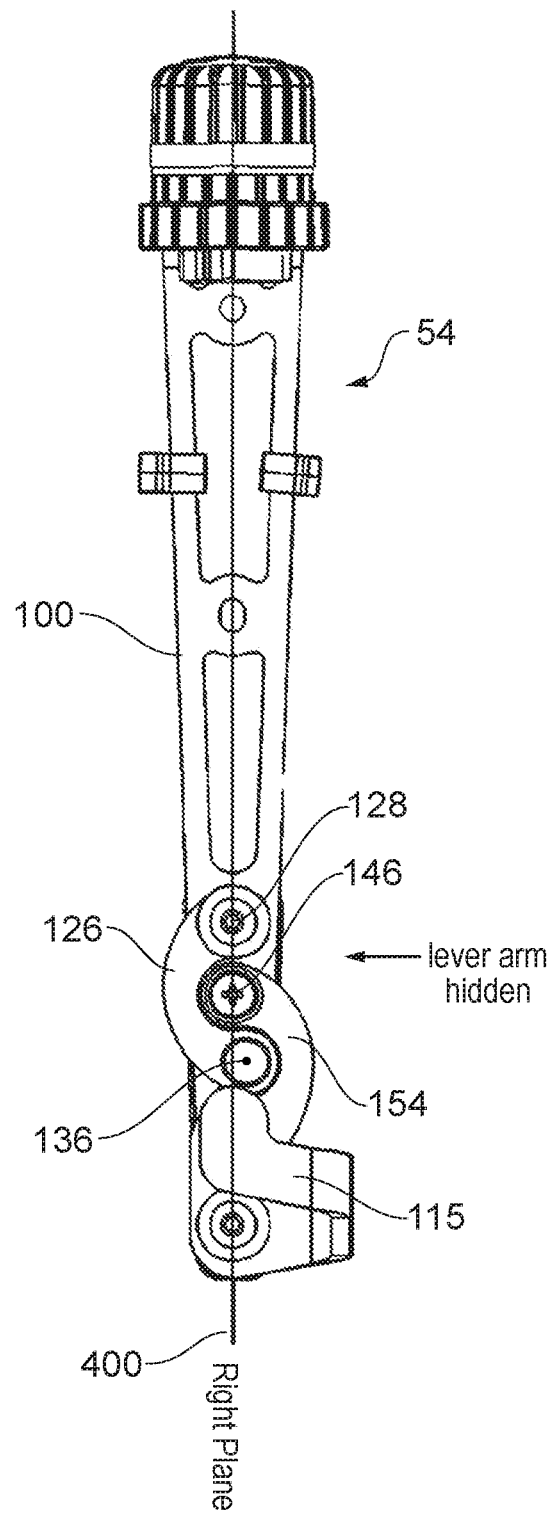
FIG. 20
FIG. 21

BATTERY HOLDER

This application claims priority to British Patent Application No. 1900069.4 filed on Jan. 3, 2019, which is hereby incorporated herein by reference.

The present technique relates to the field of cycles. More particularly, it relates to a battery holder for fitting a battery pack to a frame of a cycle.

A cycle, such as a pedal cycle or motorcycle, may have a battery pack comprising a battery for powering at least one component of the cycle. For example, the battery may be for powering an electric motor in an electric cycle, or for powering lights or electronic equipment such as a cycle computer. The present technique seeks to provide an improved battery holder for fitting a battery pack to the frame of a cycle.

At least some examples provide a battery holder for fitting a battery pack to a frame of a cycle, the battery holder comprising: a spine portion for fixing to the frame; a connector portion at one end of the spine portion, to form an electrical connection between the battery pack and wiring for connecting to at least one component of the cycle when the battery pack is held by the battery holder; a battery moving portion at the other end of the spine portion, for moving the battery pack towards the connector portion to engage the battery pack with the connector portion, the battery moving portion being slidable in a linear direction between an open state providing clearance for the battery pack to be inserted into or removed from the battery holder, and an engaged state in which the battery moving portion is closer to the connector portion than in the open state; and a lever mechanism to actuate sliding of the battery moving portion in a linear direction between the open state and the engaged state, the lever mechanism having a retained state which provides resistance to removal of the battery pack from the battery holder when the battery pack is held between the connector portion and the battery moving portion with the battery moving portion in the engaged state.

At least some examples provide a cycle fitted with a battery holder as discussed above.

At least some examples provide an electrically assisted cycle kit for retrofitting to a cycle, the kit comprising the battery holder as described above.

Further aspects, features and advantages of the present technique will be apparent from the following description of examples, which is to be read in conjunction with the accompanying drawings, in which:

FIG. 1 schematically illustrates an example of a battery holder fitted on a cycle;

FIGS. 10 and 11 show an example of insertion of the battery pack into the battery holder in a tilted position;

FIGS. 16 and 17 show views, without and with the battery pack respectively, of the battery holder with the lever mechanism at a centre position and the battery moving portion in an engaged state;

FIGS. 20 and 21 show two alternative views of the battery holder with the lever arm in a third position, shown without the battery pack;

Figure 1:
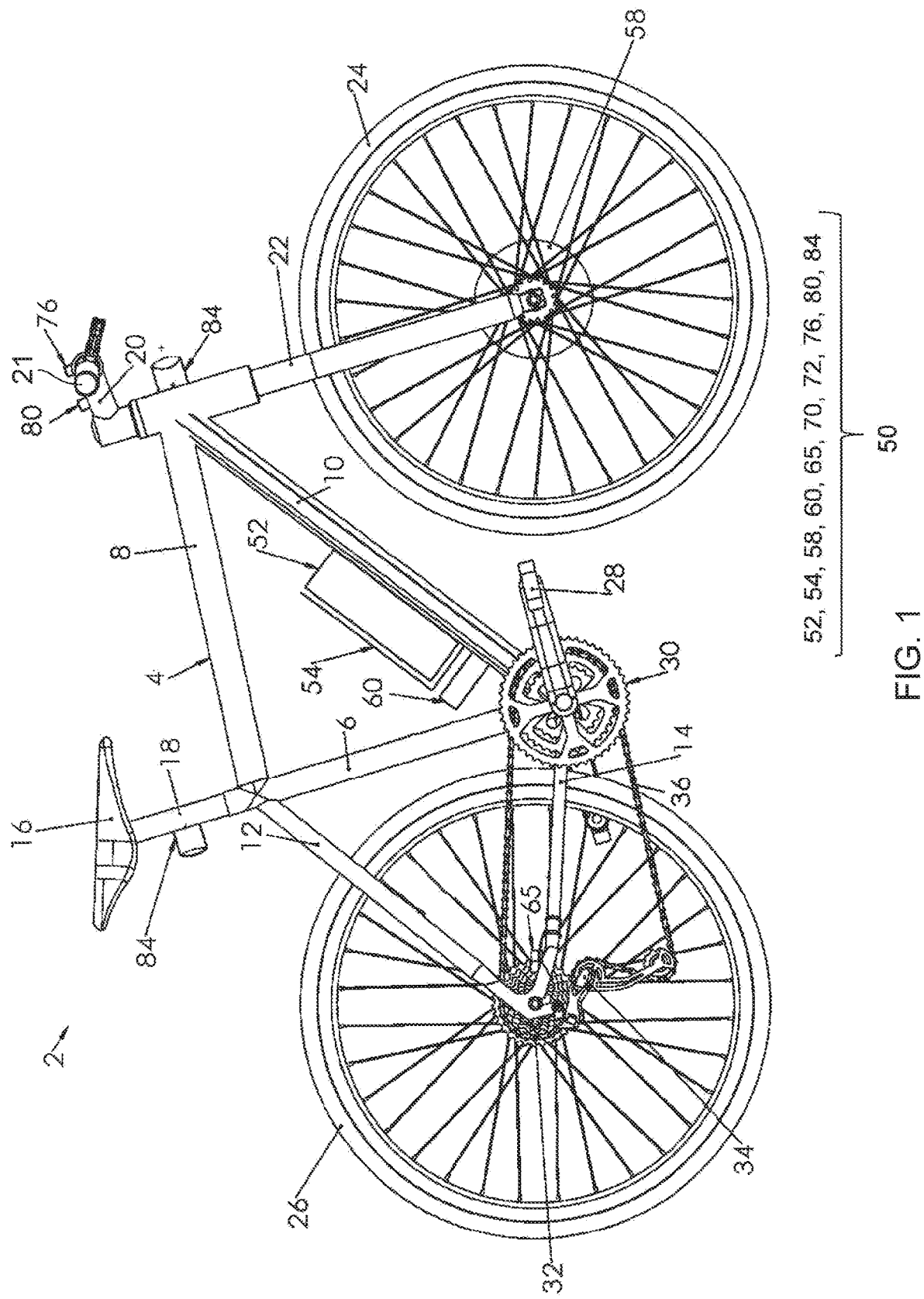

The inventor of the present technique recognised that there is a significant design challenge in providing a battery holder suitable for fitting a battery pack to a frame of a cycle. Firstly, the space available within the frame for accommodating the battery holder is typically limited, especially if the battery holder is to be compatible with a wide range of different frame sizes or shapes. Also, the electrical connection formed between the battery pack and other components of the cycle can make fitting the battery pack more complex, and may limit how compact the battery holder can be made. Also, it may be desirable that the battery pack is held securely so that it does not rattle, move or fall off the frame while the cycle is in motion. Many battery holders are either ineffective at holding the battery when the cycle is in motion (resulting in annoying rattling or the battery pack falling out when the cycle is moving over rough terrain), take up a large amount of space and so are not compatible with relatively small frames, or are limited in the number of electrical connections they can make.

The battery holder described below has a spine portion for fixing to the frame of the cycle. The spine portion acts as the structural backbone of the holder, providing structural support for the holder and battery pack when fitted. The battery holder has a connector portion at one end of the spine portion, to form an electrical connection between the battery pack and wiring for connecting to at least one component of the cycle when the battery pack is held by the battery holder. A battery moving portion is provided at the other end of the spine portion. The battery moving portion is for moving the battery pack towards the connector portion to engage the battery pack with connector portion. The battery moving portion is slidable in a linear direction between an open state providing clearance for the battery pack to be inserted into or removed from the battery holder, and an engaged state in which the battery moving portion is closer to the connector portion than in the open state. A lever mechanism is provided to actuate sliding of the battery moving portion in a linear direction between the open state and the engaged state. The lever mechanism has a retained state which provides resistance to removal of the battery pack from the battery holder when the battery pack is held between the connector portion and the battery moving portion with the battery moving portion in the engaged state.

This approach provides a number of advantages. Firstly, as the battery moving portion is slidable in a linear direction, it can move the battery pack linearly into engagement with the connector portion. This contrasts with some battery holder designs where the user has to twist the battery pack into engagement with the connector. Forming the electrical connection with a linear motion can be important because some connector designs are not capable of forming a connection by rotating connector pins into place or inserting a connector pin into a socket at an angle, especially when a larger number of connections is required. Hence, providing a linear motion for the connection between the battery and connection portion can greatly enhance the flexibility of connector designs that can be used for the battery pack. For example, connectors with two or more parallel pins can be used to enable delivery of greater current, which would be difficult to connect by a twisting or rotating action.

Also, as a lever mechanism is provided to actuate sliding the battery moving portion in a linear direction between the open state and the engage position, the lever provides a lever advantage so that the force applied by the user to the lever mechanism is multiplied to provide a greater force for moving the battery pack into engagement with the connector and causing retention of the battery pack in the holder. Hence, the fastening of the battery pack into the holder can be easier, and require less effort from the user, compared to mechanisms which require the user to apply the full clamping force.

Also, the actuation of the lever mechanism has two purposes: not only actuating sliding of the battery moving portion to move the battery pack into engagement with the connector, but also causing entry into a retained state which provides resistance to removal of the battery pack from the holder. The provision of the retained state reduces rattling of the battery pack when the cycle is in motion of rough ground, improves electrical safety by reducing the chance of the connector disengaging during cycling (which could cause arcing), and improves cycle safety by reducing the chance that a cycle component (such as lights or an electric motor) being powered by the battery pack cuts out suddenly due to jolting the battery out of engagement with the holder. The user can, with a single motion of the lever mechanism, both cause the electrical connection to be formed between the battery pack and the wiring on the cycle, and also place the battery pack in the retained state in which it is held securely between the connector portion and the battery moving portion. This makes it much more straightforward for the user to form the electrical connection, compared to designs which require two separate connecting and clamping actions.

Hence, the battery moving portion and the lever mechanism are designed to be suitable for enabling the battery pack to be moved towards the connector portion by being pushed by the battery moving portion, with the movement of the battery moving portion being controlled by actuation of the lever mechanism. This contrasts with alternative designs where the user would first fix the battery pack to the connector portion manually, and then move a separate clamping mechanism into position on the rear end of the battery pack after the connector is already engaged. The approach of using the battery moving portion to actually move the battery pack onto the connector portion using the lever mechanism of the control has the advantage that it is less fiddly for the user, as the user can form the connection and the clamping of the battery pack in the retained state using a single action of the lever mechanism, rather than first having to form a connection manually and then separately to provide a clamping action with a separate clamp mechanism. This greatly improves the convenience of use of the battery holder with the cycle, as it makes connecting and disconnecting the battery pack much quicker and more straightforward. With the wiring at the static end, this also allows much neater wiring and provision is not required to allow for moving of electrical cables, such as large radius bends and bushings.

Also, as the battery moving portion moves the battery pack into position, this can reduce the need for the user to visually confirm alignment between the battery moving portion and connector portion (as discussed below, the battery moving portion may be designed to limit the orientation in which the battery can be inserted to reduce the chance of incorrect alignment). As there is little need for the user to confirm alignment of the battery and connector visually, this means there is less need for a large clearance between the top of the battery pack and the end of the connector portion when the battery is inserted, so that the battery holder can be made more compact by reducing the clearance between the battery pack and connector portion. That is, for a given size/capacity of battery, the size of holder can be reduced by reducing the clearance at the point when the battery is inserted. This can be particularly useful for battery holders intended to fit to a range of cycle designs of different sizes or configurations.

Hence, the lever mechanism provides a lever advantage in actuating the sliding of the battery pack onto the connector (and also to move the lever mechanism into a retained state to resist removal of the battery pack). This approach would be seen as counter-intuitive in this field, as one would expect that providing a lever force for levering the battery pack onto the connector portion would be undesirable, as the multiplied force from the lever could cause damage to the connection pins as the battery pack is brought into engagement with the connector portion. For this reason, most typical battery holder designs may require the user first to engage the battery pack with the connector portion and then separately to provide any clamping once the connector is already engaged. However, the inventor recognised that, in practice, the increased force due to the lever advantage provided by the lever mechanism can be offset by the weight of the battery as the battery is slid into engagement with the connector portion, which can reduce the force applied to the connector pins as the battery engages with the connector portion. Also, the lever mechanism can be designed to delay entry into the retained state until the connector portion is already engaged with the battery pack, to reduce the chance of damage of the pins. In some examples, the lever mechanism may have a variable mechanical lever advantage at different points of its motion, with a smaller lever advantage prior to the lever arm reaching the second position and a larger lever advantage as the lever arm moves from the second position to the third position. Hence, a smaller lever advantage occurs prior to engagement of the battery pack with the connector, and a larger lever advantage, for securely holding the bottle, occurs after the connector portion is engaged. Therefore, counter-intuitively, it is possible to use a lever mechanism to lever the battery pack into engagement with the connector portion and provide resistance to removal of the battery pack, without damage to the connector pins, and by doing so this provides the advantages discussed above.

The connector portion may be static relative to the spine portion of the battery holder. This contrasts with other approaches where the battery pack is static while the connector portion is moved onto the battery under control of the user. An advantage of using a static connector portion is that the wiring passing to the connector portion from at least one other component of the cycle does not need to move as the engagement between the connector portion and the battery pack is formed. This can make the cabling much neater. Also, depending on the design of the cycle, this can enable use of the battery holder with cycles where the cabling is hidden within the frame, which would be harder to implement if the connector portion moved (as in that case the internal cabling within the frame would need to include some slack to accommodate the motion of the connector portion). Another advantage is that as the connector portion does not move, then this can provide extra flexibility for the choice of locations of the other components of the cycle to be powered by the battery pack, such as a motor, lights, cycle computer, etc. For example, when the battery pack is used to power a motor from an electric cycle, if the connector portion moved then this would require that the loops of cabling would need to be designed to allow for movement of the connector, the design of these loops being different dependent on the position of the motor of the cycle. With a static connector portion this provides equally neat cabling with a motor either in the front wheel, rear wheel, or crank or even if the motor is within the battery pack itself. This is just one example, but it serves to show how using a static connector can make design of the rest of the cycle more straightforward and accommodate more design options.

The lever mechanism may provide the retained state, which provides resistance to removal of the battery pack, using an over-centre mechanism. This is a type of mechanism which has, at a certain point within its motion, a defined centre position which is such that, when the mechanism is on one side of the centre position then the prevailing forces acting on the mechanism will tend to move the mechanism away from that centre position, while when the mechanism is on the other side of the centre position then again the prevailing forces will tend to move the mechanism away from the centre position. Hence, the lever mechanism may be seen as a bistable system in that it is more stable either side of the centre position than it is on the centre position itself. Hence, in use, the user may need to apply a certain amount of force to the lever mechanism to move the mechanism across the centre position, in either direction. This means that once in the retained state, unless the user applies that force, the lever mechanism will remain in the retained state and the battery pack can remain securely fastened within the holder. Further, if the retained state is on the opposite side of the centre position to that where engagement occurs and a stop prevents the lever moving further from the central position than the retained position, then the battery pack can only be removed by first applying force to the lever to move it back through the central position.

This approach has a number of advantages compared to other forms of clamping mechanism. Firstly, it provides a very secure retention of the battery pack, so that the battery pack is solidly held and that the battery pack cannot come undone. Also, an over-centre mechanism is much easier for a user to fasten than mechanisms that rely on a friction fit (interference fit), where the mechanism has parts which are compressed against each other with the frictional contact providing the clamping. Mechanisms which rely on a friction fit to provide the clamping may be prone to becoming stiffer to fasten and unfasten over time, as dirt gets into the mechanism when the cycle is in use, so that it becomes harder and harder to fasten the battery pack securely. This can risk the user not fully fastening the battery pack so that the battery pack may come apart from the connector. In contrast, by using an over-centre mechanism, exploiting the alignment of forces acting on elements of the connector rather than on frictional contact, the mechanism is less stiff to fasten even when clean and does not have the same problem of deterioration over time.

The lever mechanism may have a lever arm which actuates sliding the battery moving portion from the open state to the engaged state in response to movement of the lever arm from a first position to a second position. The lever arm may control the lever mechanism to enter/exit to/from the retained state. Hence, at the point at which the lever arm reaches the second position, the connector portion and battery pack may be engaged. Here the engaged state may be any position in which, when the battery pack is held within the battery holder, the connector portion of the holder is engaged with the battery pack. Some movement of the battery moving portion may still be possible when the battery is held and the battery moving portion is in the engaged state, because after the battery moving portion reaches the engaged state when the connector engages, there may still be some more movement of the battery moving portion before the battery pack becomes securely clamped in the retained state, this is because even when all the items (battery pack, battery moving portion, connector and any compression elements) are in contact, there may be some further flexing of the spine or moving portion, compression in the connector and compression elements or compression of the casing of the battery pack between the battery moving portion and the connector.

Then, in response to continued movement to the lever arm from the second position to a third position, the lever arm may control entry into the retained state, in which the lever mechanism provides resistance to removal of the battery pack from the holder. Hence, the movement of the lever arm from the second position to the third position to cause entry into the retained state is a continuation of the movement of the lever arm from the first position to the second position to cause the battery pack to be moved by the battery moving portion into engagement with the connector portion. Hence, a single continuous motion of the lever arm from the first position to the third position (via the second position) both forms the electrical connection and causes the battery to be retained securely. This makes it simple for the battery to be securely fitted into the holder by the user. Also, with this approach, as the entry into the retained state occurs as the lever arm moves between the second position and third position, and as the engaged state is already reached when the lever arm reaches the second position, this means that any force needed to gain entry into the retained state may be applied after the connector is already engaged, which can help reduce the likelihood of damage to the connector pins at the interface between the battery pack and the connector portion.

The lever mechanism may have an element which moves past a centre position in response to movement of the lever arm between the second position and the third position (in the specific examples described below this element is the second end of the connecting arm but other implementations could have a different element which serves this function). When the lever arm is in the third position, the lever mechanism may resist movement of the element back past the centre position until a force is applied to the lever arm to move the lever arm from the third position to the second position. Hence, this provides the over-centre mechanism discussed above, which provides effective retention of a battery within the holder to avoid rattling and may be easy to fasten and unfasten by the user.

In some examples, when the element is at the centre position, there may be a gap between an end surface of the element and an opposing surface of another part of the lever mechanism which the end surface moves past as the lever arm moves between the second and third positions. In some cases there may be several such gaps, e.g. when viewed from different angles. For example, there could be a gap when viewed in plan view or when viewed from the side. In general, by having gaps between opposed surfaces as the element crosses the centre position, this means that the mechanism does not rely on a friction fit between parts to provide clamping, which makes the mechanism much easier to fasten and unfasten.

In one example, the lever mechanism may include a number of moving parts coupled together at pivot joints. In some implementations, the moving parts may touch only at the pivot points, and may not be in contact further from the pivots. This reduces friction between the moving parts of the mechanism which makes the mechanism easier to do up and undo.

When the lever arm is in the third position, a part of the lever mechanism (e.g. the lever arm) may abut against a stop surface. The stop surface could be the surface of the spine portion of the battery holder, or a surface of the battery moving portion, or a surface of one of the other parts of the lever mechanism, or a dedicated stop surface (such as a rubber pad) may be attached to the surface of the spine portion or another portion, so that part of the lever mechanism rests against the stop surface when the lever arm is in the third position. In one particular example, the lever arm rests against a surface of the battery moving portion when the lever arm is in the third position. Alternatively, another part of the lever mechanism other than the lever arm (e.g. the connecting arm described below) could rest against a stop surface when the mechanism is in the retained state. By providing a stop, this prevents the mechanism moving further from the centre position than the position in which the mechanism is in the retained state, to ensure the battery is held securely without rattling and cannot be removed.

The battery holder may include a catch member configured, when in a catching position, to resist displacement of the lever arm when the lever mechanism is in the retained state. This prevents the lever arm being moved to an incorrect position due to being incorrectly positioned or accidentally knocked by a user, which could otherwise risk the battery pack coming loose during cycling.

The catch member may have a surface configured to be contacted by the lever arm as the lever arm moves towards a position in which the lever mechanism is in the retained state, to cause the catch member to be temporarily displaced allowing the lever arm to pass the catch member. The catch member may be biased to return to the catching position once the lever arm has passed the catch member. This means that when securing the battery pack into position, there is no need for the user to manually move the catch member out of the way of the lever arm, which improves ease of use.

The lever arm may include a locking hole for receiving a lock for restricting displacement of the lever arm. For example, a padlock may be passed through the locking hole to fix the lever arm to one of the other parts of the holder, such as the spine portion or the battery moving part, to prevent the lever arm being moved back towards the second position. This prevents movement of the lever mechanism beyond the point at which the battery pack can be removed, to provide a deterrent against opportunist theft of the battery pack from the holder when the cycle is parked in a public location.

In one example, the lever mechanism may have a connecting arm and a lever arm. A first end of a connecting arm may be coupled to the spine portion of the battery holder by a first pivot. A second end of the connecting arm may be coupled to an intermediate point of the lever arm by a second pivot. One end of the lever arm may be coupled to a part of the battery moving portion by a third pivot. The third pivot may be configured to slide along the spine portion with an axis of the third pivot tracing out a plane as the third pivot slides. When the lever mechanism is in the retained state, the second pivot may be on an opposite side of the plane compared to the side of the plane at which the second pivot is positioned when the battery moving portion is in the open state.

This arrangement provides a mechanism which is relatively straightforward to manufacture, requires very little effort from the user to switch between the open state and the retained state, but which nevertheless provides secure retention of the battery pack in the holder. Once the second pivot has crossed to the far side of the plane traced out by the axis on the third pivot, compared to the side on which it is positioned when the battery moving portion is in the open state, then the prevailing forces (such as the weight of the battery pack under gravity, or any knocking forces applied to the battery moving portion while the cycle is being ridden) will tend to urge the second pivot away from the plane traced out by the axis of the third pivot. This means that the lever mechanism tends to remain in the retained state once fastened. Hence, this provides secure retention.

In one example, the part of the battery moving portion which is coupled to one end of a lever arm by the third pivot may comprise a looping portion of the battery moving portion, which includes an indent positioned between the third pivot and a part of the battery moving portion for engaging with the battery pack. This indent may be shaped to receive the second end of the connecting arm when the lever mechanism is in the retained state. Hence, with this design, the second end of the connecting arm moves down and nestles within the indent within the loop provided in the battery moving portion, which can provide a more compact design. Nevertheless, it would also be possible to use other designs where the end of the connecting arm does not nestle within an indent of the battery moving portion when in the retaining state. For example, instead of swinging into the indent within the battery moving portion, another option could be that the connecting arm could swing up above or swing down below the top of the battery moving portion as the second end of the connecting arm crosses the centre position of the over-centre mechanism.

In cases where such a looping portion is provided, then when the second end of the connecting arm is positioned within the indent with the lever mechanism in the retained state, then there may be a gap between the surface of the second end of the connecting arm and the corresponding opposed surface of the indent which faces the surface of the connecting arm when the connecting arm nestles into the indent. Again, having a gap between the opposed surfaces of the indent and connecting arm means the clamping is not provided by a friction fit, and so the mechanism requires less effort to fasten/unfasten.

Alternatively, in other examples the looping portion of the battery moving portion may act as a stop for the connecting arm when in the retained state, so there may be contact between the looping portion and the end of the connecting arm when in the retained state. However, there is still no need for a friction fit to provide the retained state, so up to the point at which the connecting arm contacts the stop surface of the looping portion, there may be a gap between the opposed surfaces of the connecting arm and looping portion.

In some examples, one of the bolts for fixing the spine portion to the frame may also serve a purpose of acting as one of the first, second and third pivots (e.g. the first pivot may be a joint pivoting about the fixing bolt for fixing the spine portion to the frame). Alternatively, separate pivot fixings and fixing bolts could be provided.

Also, in examples similar to the design discussed below, the spine portion may have a number of alternative fixing positions to accommodate different relative offsets of the battery holder relative to the frame, which can help to accommodate differences in frame design and the presence of other objects which may be attached to the frame, which the battery holder has to fit around. In this case, one option is that the battery holder is supplied with two or more sets of alternative fixings, including fixings of different lengths, which can be selected depending on the particular fixing position selected. If the selected fixing position corresponds to the position of one of the pivot joints for which the pivot axis is to remain static relative to the frame (e.g. the first pivot), then a longer fixing for the pivot can be selected so that the pivot fixing can extend further into the cycle frame to also fasten the holder to the frame. If a fixing position which does not correspond to the position of a pivot joint is selected, then a shorter fixing may be provided at the pivot joint (so that the pivot fixing does not extend on into the frame), and a separate fixing may be provided at the selected fixing point to fix the spine portion to the frame.

The spine portion may include a guide groove and the third pivot may be slidable within the guide groove. For example the guide groove may be aligned parallel to the plane traced out by the axis of the third pivot as it slides along the spine portion in response to actuation of the lever. By providing a linear groove, this guides the battery moving portion to move in a linear motion as the battery pack is engaged with a connector portion, to enable use with more complex multi-pin connector designs as discussed above.

Also, the battery moving portion may be coupled to the spine portion by a fixing at a position further from the connector portion than the third pivot, and this fixing may be slidable within a second guide groove which is provided on one of the battery moving portion and the spine portion.

By providing two parallel guide grooves, one receiving the third pivot, and one further from the connector portion (either on the battery moving portion or on the spine portion), this ensures that the battery pack remains aligned with the connector as it slides in a linear manner onto the connector.

The battery holder may have at least one compressible element made of resilient deformable material (e.g. rubber) which is configured to be compressed when the battery pack is engaged with the connector portion and the battery moving portion is in the engaged state, and to restore its original volume when the battery pack is removed. For example, a washer could be compressed either between the connector portion and another portion of the battery holder, or compressed between the battery pack and the connector portion when the battery pack is engaged with the connector portion, or both. In another example, a compressible portion may be included in the battery moving portion (e.g. the engaging hook of the battery moving portion may include a rubber portion) to allow compression at the other end of the battery pack. This provides several advantages. Firstly, the compressible element(s) can act as a spacer to accommodate manufacturing tolerances, for example if necessary several rubber washers can be used to accommodate a larger gap and these may all compress as the battery is engaged with a connector and held by the holder. Also, the compressible element(s) may provide some clamping compression to help retain the battery pack more securely within the holder and resist rattling. Some additional clamping protection may also be provided by flex in the spine portion or other portions of a cage defining the battery holder, as the battery is clamped into the cage by the battery moving portion. For a washer provided between the connector portion and the battery pack itself, this also acts as a water seal to reduce the chance of water entering the battery pack.

The battery moving portion may comprise at least one battery engaging hook having a curved surface permitting the battery pack to be inserted onto the hook in an angled position when the battery moving portion is in the open state and then, while the battery pack remains engaged with the engaging hook, tilted from the angled position into an aligned position ready for engagement with the connector portion. This arrangement is useful because it permits the battery holder to be fitted to cycles with smaller frames. By tilting the battery pack into the holder it is not necessary to provide spare space above the battery holder to allow the battery pack to be slid into position from a position with large clearance between the end of the battery pack and the connector portion. Instead, the battery pack can simply be inserted onto the hook and then tilted in from the side which is more efficient in terms of space. Having tilted the battery pack into the aligned position, the lever mechanism may then be actuated as discussed above to move the battery pack into engagement with the connector.

For example, the battery pack may have at least one corresponding slot for engaging with the at least one battery engaging hook with the battery moving portion. Each slot in the battery pack may have a curved internal surface so that the battery pack can tilt over the corresponding hook of the battery moving portion while remaining engaged with the hook. Also by using an arrangement or shape of the slot(s) and hook(s) which has a limited order of rotational symmetry (e.g. two-fold rotational symmetry) this can limit the number of orientations in which the battery pack is able to be engaged with the hook(s) which can simplify ensuring that the user inserts the battery pack onto the hook(s) in the correct orientation for engaging with the connectors. For example the battery pack may only fit onto the hook(s) in one of two orientations (180 degrees offset from each other), and so the user could use a given point of the battery pack (e.g. a label, sticker, marking or other visual element of the battery) as a reference to determine which way round the battery pack should be inserted.

The connector portion may have two or more pins for engaging with respective connector sockets of the battery pack, in some implementations. By using a linear sliding motion to slide the battery pack onto the connector, this makes it more practical to use multi-pin connectors which can increase the maximum current which can be supplied by a battery and increase the number of ancillary connections such as sensors, lights and interfaces.

In some examples the battery holder may be supplied without the battery pack itself, and the battery pack may be supplied separately from the holder. In other examples the battery holder and battery pack may be supplied together.

The design of the battery holder and battery pack may be such that when the battery pack is inserted into the battery holder with the battery moving portion in the open state, a clearance between the connector portion and the battery pack is a maximum of 5 mm. More specifically, the clearance could be less than or equal to ($\leq$) 4.5 mm, or $\leq$4 mm, or $\leq$3.5 mm or $\leq$3 mm, or $\leq$2.5 mm, or $\leq$2 mm, or $\leq$1.5 mm, or $\leq$1 mm. Hence, with the battery holder of the type discussed above, the provision of the battery moving portion means that the battery pack can be inserted into the holder and fastened in the retained position without the user needing to manually align the battery precisely relative to the connector portion, and so does not need a significant amount of gap between the top of the battery pack and the bottom of the connector portion to confirm alignment visually. This makes it possible to use the battery pack in confined conditions where there is very little spare space within the frame of the cycle for fitting the battery pack. This can be particularly useful for retrofittable cycle kits as discussed below, but could also be useful for standalone cycles.

A cycle may be fitted with a battery holder as discussed above. For example, the cycle may comprise a pedal cycle such as a bicycle, tricycle or tandem, or a motorcycle or a quadbike for example. The battery within the battery holder may be used for powering any components in a cycle, but may be particularly useful when used for controlling a motor for an electric cycle and/or any sensors, such as a pedal sensor or a gear tooth sensor, for sensing data for controlling the amount of assistance provided. Also, lights, a cycle computer, or other electronic equipment attached to the cycle may be powered by the battery pack.

In another aspect, the present technique may provide an electrically assisted cycle kit for retrofitting to a cycle, with the kit comprising the battery holder as discussed above. The kit may also include the battery pack. Also the kit could include other components such as a motor, pedal speed sensor, switch, display or other interface, as well as the battery holder and battery pack. The kit could also include a charger for charging the battery pack. The battery holder of the type discussed above is particularly useful for a retrofittable kit for converting an existing non-electrically assisted cycle into an electrically assisted cycle, because the compact nature of the battery holder makes it suitable for frames of a wide range of different cycles of different sizes and shapes, and the design of the lever mechanism and the connector makes it very easy for an ordinary user (who is not an experienced cycle mechanic) to insert and remove the battery pack from the holder.

As discussed in the examples above, the spine portion which fixes to the frame of the cycle may have the connector portion at one end and the battery moving portion at the other end. However, it is also possible for the battery holder to also include a further extension of the spine portion, which passes beyond the end of the spine portion at either the connector portion end or the battery moving portion end. Hence, the term spine portion refers to the section of the battery holder which passes between the connector portion and the battery moving portion, but it is possible that the holder could include further extensions beyond the spine. However, in practice, avoiding further extensions beyond the spine can help to keep the holder more compact.

FIG. 1 schematically illustrates an example of a pedal cycle 2. While FIG. 1 shows a bicycle, it will be appreciated that the present technique could also be applied to other types of cycles such as a tricycle, tandem or motorcycle. The pedal cycle 2 comprises a frame 4 including a seat tube 6, top tube 8, down tube 10, seat stays 12, and chain stays 14. The cycle 2 also includes a saddle 16, seat post 18, stem 20, handle bars 21, front fork 22, front wheel 24, rear wheel 26, pedals 28, front sprockets or chain rings 30, rear sprockets 32, derailleur 34 and chain 36. While FIG. 1 shows a cycle with derailleur gears, it could also use hub gears for example.

To provide assistance with pedal cycle motion, the cycle 2 is fitted with an electrically assisted cycle kit 50. The kit 50 is shown functionally in FIG. 2 and shown fitted to the cycle 2 in FIG. 1. By fitting the components of the cycle kit 50 to the cycle 2, a standard (non-electrically assisted) cycle 2 can be converted into an electrically assisted cycle. The cycle kit 50 includes a battery 52 for providing power to the other elements of the cycle kit 50. In FIG. 1, the battery 52 is shown mounted in a battery holder (cage) 54 fitted to the down tube 10 of the frame 4, in a similar way to a cage for a water bottle. In other examples, the battery may be connected to other portions of the frame 4 (for example, the seat tube 6) and need not be formed in the shape of a water bottle. The kit 50 is also provided with a battery charger 56 for recharging the battery 52.

The kit 50 also includes an electric motor 58 for providing electrical assistance for pedal cycle motion. In the example of FIG. 1, the motor 58 is a hub motor fitted to the front wheel 24 of the cycle 2, but in other embodiments a crank drive motor or a rear wheel drive motor can be used. A brushless sensorless hub motor is particularly useful for its reliability, low cost and efficient operation. Also, the motor could be a direct drive motor, or a motor with gearing inside a hub (e.g. planetary gearing) to match the speed needed for cycling.

The cycle kit 50 also includes a controller 60 for controlling the operation of the various components of the cycle kit 50. The controller 60 controls the drive of the electric motor 58. While FIG. 1 shows the controller 60 mounted on the frame 4, in practice the controller 60 can be provided within the casing of the battery 52 itself, to make the kit more compact and reduce the number of components that need to be fitted to install the kit on the cycle. It will be appreciated that in other embodiments the controller 60 may be located at any location on the cycle 2, such as on the down tube 10 or within the battery cage 54 or motor 58 for example.

A gear tooth sensor 65 is provided for sensing motion of the teeth and valleys of a gear sprocket 32 of the cycle 2. In the example of FIG. 1, the gear tooth sensor 65 is mounted on the chain stay 14 of the frame 4 to sense the motion of one of the rear sprockets 32. However, in other embodiments the gear tooth sensor 65 may be mounted to a different part of the frame or to the rear axle of the cycle 2, and may sense motion of one of the front chain rings 30 instead of the rear sprockets 32. For example, the gear tooth sensor 65 may be fitted to sense the teeth and valleys of the largest rear sprocket 32. This is useful since the largest rear sprocket 32 has more teeth and valleys than the other sprockets and so the gear tooth sensor 65 can detect changes in pedaling speed and acceleration with greater sensitivity. However, other sprockets may also be used, for example if the largest sprocket is not ferrous (typically smaller sprockets are more likely to be ferrous because they experience wear), or if using a smaller sprocket makes it easier for the sensor 65 to be positioned so that it does not get in the way of the chain 36. The gear tooth sensor 65 provides a gear motion signal to the controller 60 and the controller 60 controls the drive of the electric motor 58 based on the gear motion signal. The speed/acceleration of motion of the teeth and valleys of the gear sprocket 32 is representative of the speed/acceleration of pedaling by the cyclist, since the sprocket 32 rotates when the pedals rotate. Therefore, by controlling the motor drive based on the sensed speed/acceleration of motion of the gear sprocket 32, the assistance provided by the motor 58 can be controlled in a way that is appropriate to the cyclist's pedaling. Hence, rather than driving the motor with a speed independent of any pedaling effort by the cyclist, this type of kit may drive the motor with the motor drive being dependent on the pedaling rate by the cyclist, so that the motor boosts the existing pedaling by the cyclist and when the cyclist stops pedaling the motor drive also stops, so that the feel of the cycle for the user is more like a normal non-electrically assisted cycle, but with less effort needed for the user to climb hills due to the assistance provided by the motor. The gear tooth sensor 65 may be a magnetic sensor which senses the ferrous teeth of the sprocket 32. The gear tooth sensor may include a Hall sensor which uses the Hall effect to sense changes in a local magnetic field caused by ferrous objects. Further details of the gear tooth sensor 65 and the control of the motor drive by the controller 60 may be found in the published European patent EP 2657119 B1.

A user input 76 is also provided to enable the cyclist to control whether or not electrical assistance is provided by the motor 58. For example, the user input 76 may be mounted on the handlebar 20 of the cycle 2. The user input 76 may for example be an on/off button for switching on and off the power assistance. For example, a tactile momentary button may be used which produces different functions by momentary presses or by holding down the button. In other examples the user input 76 may comprise further controls and/or methods for adjusting parameters or changing mode of the cycle kit 50.

The cycle kit 50 may optionally also include other elements which are not required for providing electrical assistance but may conveniently be powered using the battery 52. For example, the kit 50 may include a cycle computer 80 for providing the cyclist with data such as the cycle speed, distance travelled, and so on. Also, front or rear lights 84 may be powered using the battery 52.

The cycle kit 50 may also include the various wires and connectors for forming electrical connections between the different components of the system, and mechanical fixings for fixing the components and wiring to the frame. The wires may be run along the frame 4 of the cycle 2 when fitting the kit 50 to the cycle 2, or may be provided internally within the frame 4. Although FIG. 2 shows a system in which, to reduce the amount of wiring, the battery 52 is connected to the controller 60 and the power for the other elements of the kit 50 is distributed from the battery 52 via the controller 60 (other than the lights 84 which are wired from the user input module 76), in other embodiments some elements may be connected directly to the battery 52.

Figure 2:
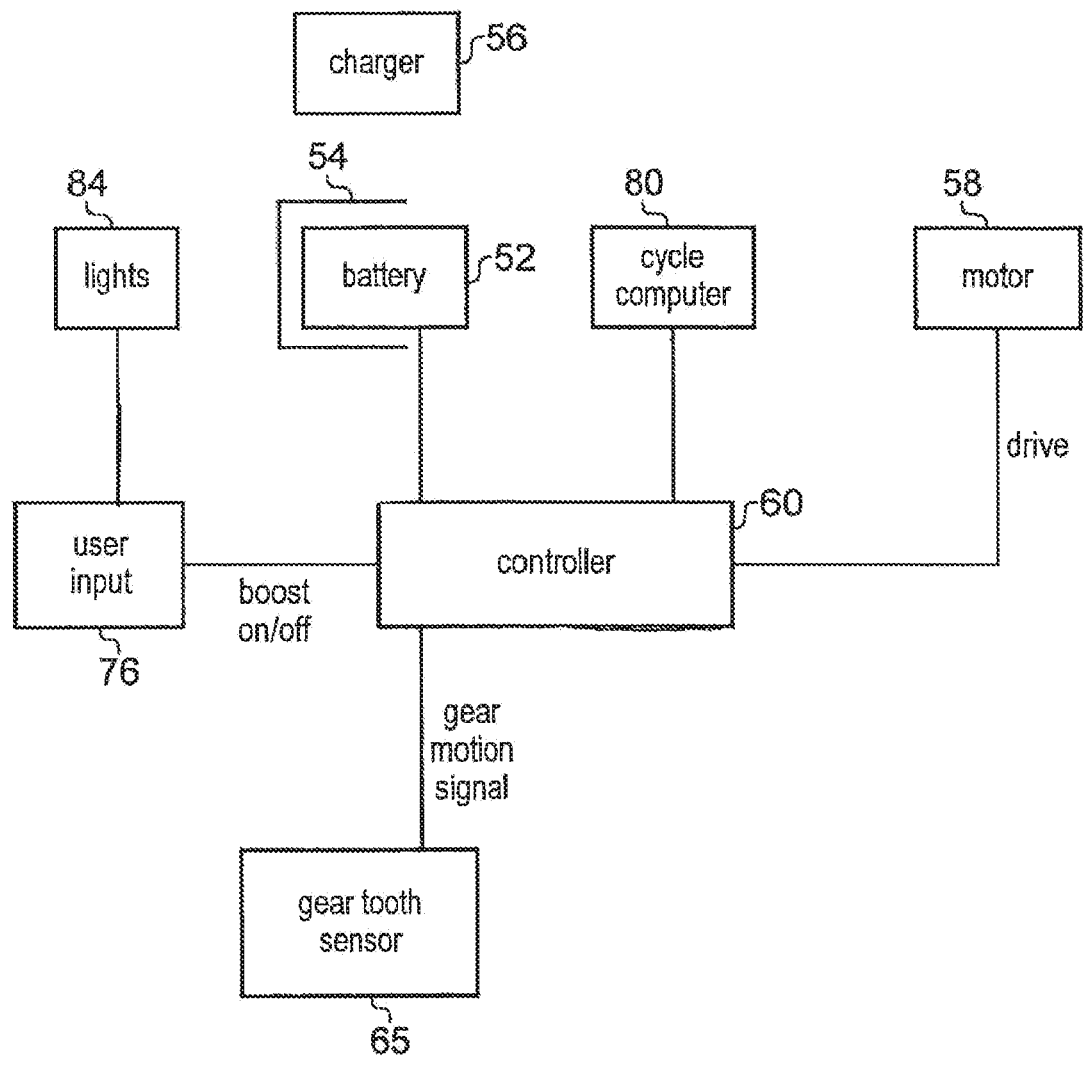
FIG. 2 illustrates an example of an electrically assisted cycle kit for fitting to a cycle.

While in the example of FIGS. 1 and 2 the battery holder 54 and battery pack 52 are part of an electrically assisted cycle kit 50 for retrofitting to a cycle, in other examples the battery holder may be provided as part of a standalone electric bike which is designed specifically for electrical assistance, rather than as part of a retrofitting kit. However, the battery holder which will be discussed below is particularly useful for a kit 50 because of its compact design and simple operation by the user, which means it can be fitted to a wide range of bikes with different sizes and configurations of frames and is convenient to remove or insert the battery from the holder 54. Also, in other examples the battery holder could be fitted to a frame of a motorcycle, rather than a pedal cycle.

Figures 3, 4:
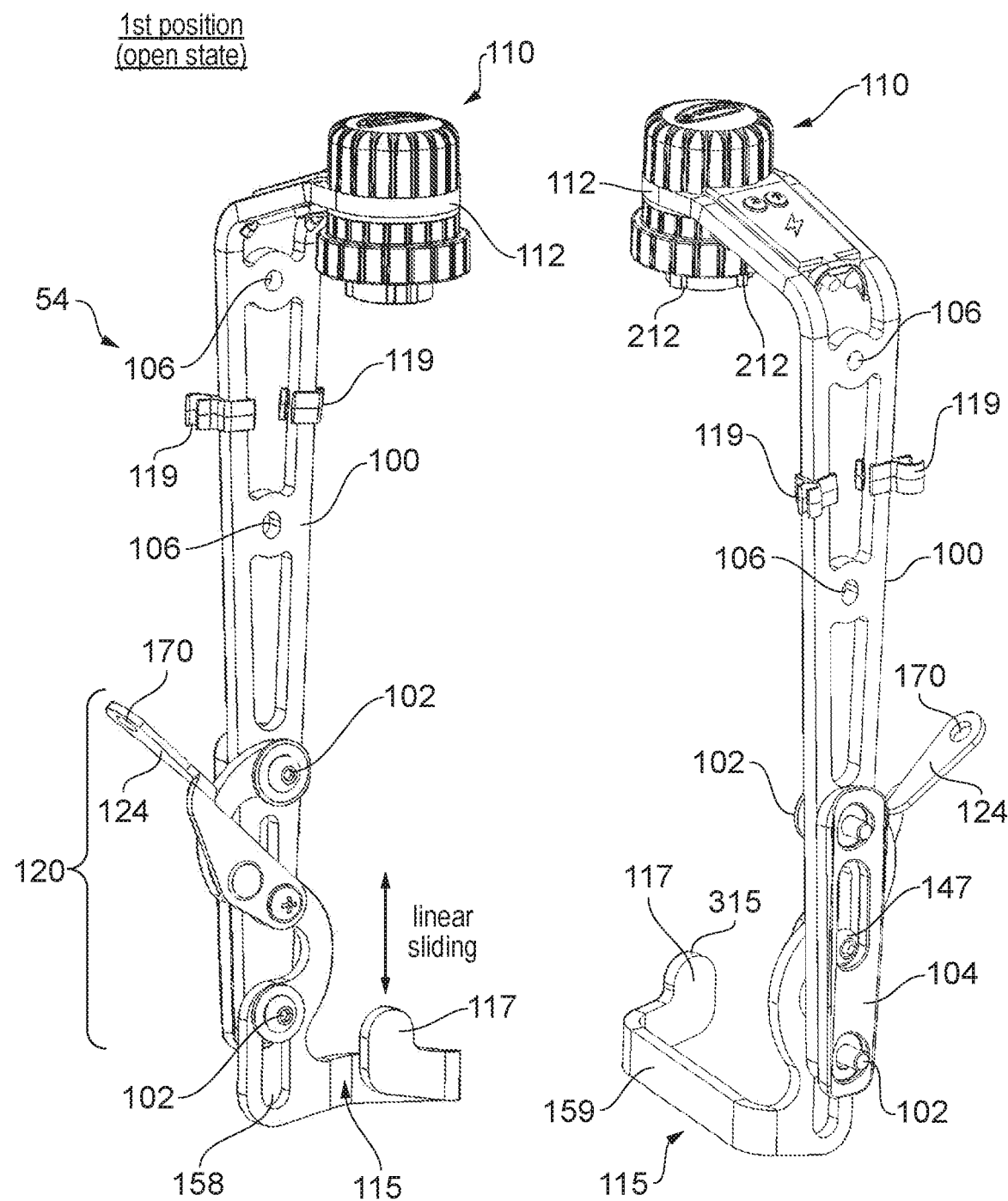
FIGS. 3 and 4 show views of a battery holder in an open state.

FIGS. 3 and 4 show the battery holder 54 in more detail (FIG. 4 shows the battery holder viewed from the opposite side to FIG. 3). The battery holder 54 includes spine portion 100 for fitting to the frame 4 of the cycle 2, a connector portion 110 for forming the electrical connection with the battery pack 52, a battery moving portion 115 for moving the battery 52 into engagement with the connector, and a lever mechanism 120 for controlling movement of the battery moving portion 115. These parts will be described in more detail below.

The spine portion 100 can be fitted to the frame 4 (e.g. on the down tube 10) in a similar way to a cage for a water bottle. In this example, the spine member 100 is fixed to the down tube by bolts 102 which pass through the spine portion and a spacing member 104 into the fixing holes which are typically provided at standard spacings of 2.5 inches (64 mm) on a cycle frame. The spacing member 104 is provided to space the holder 54 sufficiently far from the frame that the lever mechanism has room to move without touching the frame and so that the fixing or nut 147 is free to slide without touching the frame. To accommodate different fixing positions on the frame 4, the spine portion 100 has a number of alternative fixing holes 106. Two such fixing holes 106 are visible in FIGS. 3 and 4 at the end of the spine portion 100 closest to the connector portion 110. The spine portion 100 also includes another two fixing holes which are not visible in FIGS. 3 and 4 due to the bolts 102 passing through them. Each pair of alternative fixing holes is separated by the standard spacing of 2.5 inches (64 mm) between fixing holes on the down tube of a typical cycle frame. Clearly, if a different means of fixing the holder to the frame is selected, a different fixing hole spacing could be selected. While FIGS. 3 and 4 show an example with four fixing holes, where in this example the battery holder 54 has the spacer 104 and bolts 102 provided in the bottom two fixing holes, the battery holder 54 could also be attached using the middle two holes 106 or the upper two holes 106 by moving the spacer and passing a pair of bolts through the selected pair of fixing holes. If either of the lower two fixing holes 106 are not being used for fixing then the long bolt 102 shown passing through the lever mechanism into the spacer 104 could be replaced with shorter bolts secured with nuts which do not extend all the way into the cycle frame, and in this case the bolt simply acts to hold the components of the lever mechanism together and provide pivot points for the lever mechanism, but does not fix the holder to the frame (instead further fixings can be provided further up the spine portion 100). Hence, this design provides flexibility to vary the point at which the holder is fixed to the frame, which can be useful for accommodating different sizes of cycle frame and the presence of other objects which may be attached to the cycle frame.

As shown in FIGS. 3 and 4, the connector portion 110 is provided within a neck portion 112 of the battery holder at the top end of the spine portion 100. While FIGS. 3 and 4 show an example where the spine portion 100 of the battery holder terminates at the neck 112, it would also be possible for the spine portion to continue on beyond the neck to form an extension of the spine, if desired. The neck portion 112 overhangs the spine portion 100 so that when the battery pack 54 is inserted, the connection portion fits over the upper end of the battery. The overhang may be at an angle of 90 degrees or less, which makes the cage of the battery holder simpler to manufacture in a repeatable way as the flex can be achieved via rubber washers 206, 208 between the connector and the top end of the battery, rather than needing to manually bend the cage after manufacture to provide an overhang of greater than 90 degrees for clamping the battery due to the flexing of the cage as the battery is fitted into the holder, as in alternative designs.

The connector portion 110 includes the connector pins for connecting to the battery, and wiring connected to the connector pins (not seen in FIGS. 3 and 4) extends from the connector portion 110 and can then run along the frame of the cycle to the components to be powered by the battery. The connector portion 110 is described in more detail with respect to FIG. 6 below. As shown in FIGS. 3 and 4, cable clips 119 can be fitted to the spine portion 100 of the battery holder 54, to act as guides for running cables along the spine portion 100 to other components of the cycles such as the motor 58, gear tooth sensor 65, etc. The precise location of the cable clips will depend on the particular layout of the components to be powered using the battery. The cable clips 119 may be removable so that the user can choose the precise location of the clips. The clips 119 shown in FIGS. 3 and 4 are just one example.

The battery moving portion 115 is provided at the other end of the spine portion 100 from the connector portion 110, for engaging with the opposite end of the battery to the end of the battery coupled to the connection portion 110. The battery moving portion 115 is for moving the battery pack towards the connector portion 110 to engage the battery pack with the connector portion 110. The battery moving portion 115 includes a battery engaging hook 117 for engaging with corresponding slot in the base of the battery pack. FIGS. 3 and 4 show the battery moving portion 115 in an open state, when it is positioned furthest away from the connector portion 110 to provide clearance for the battery pack to be inserted into the battery holder 54 or removed from the battery holder 54. The battery moving portion 115 is slidable from the open state to an engaged state when the battery moving portion 115 is closer to the connector portion 110 than in the open state. The engaged state is such that, when the battery pack is held within the holder in the engaged state, the connector portion 110 is engaged with the battery pack to form an electrical connection.

A lever mechanism 120 is provided for actuating the sliding of the battery moving portion in the linear direction between the open state and the engaged state. Also, the lever mechanism 120 provides a retained state which provides resistance to removal of the battery pack from the battery holder 54 when the battery pack is held between the connector portion and the battery moving portion 115 with the battery moving portion 115 in the engaged state. As discussed below, this retained state is provided using an over-centre mechanism, which is described in more detail with respect to FIG. 5.

Figure 5:
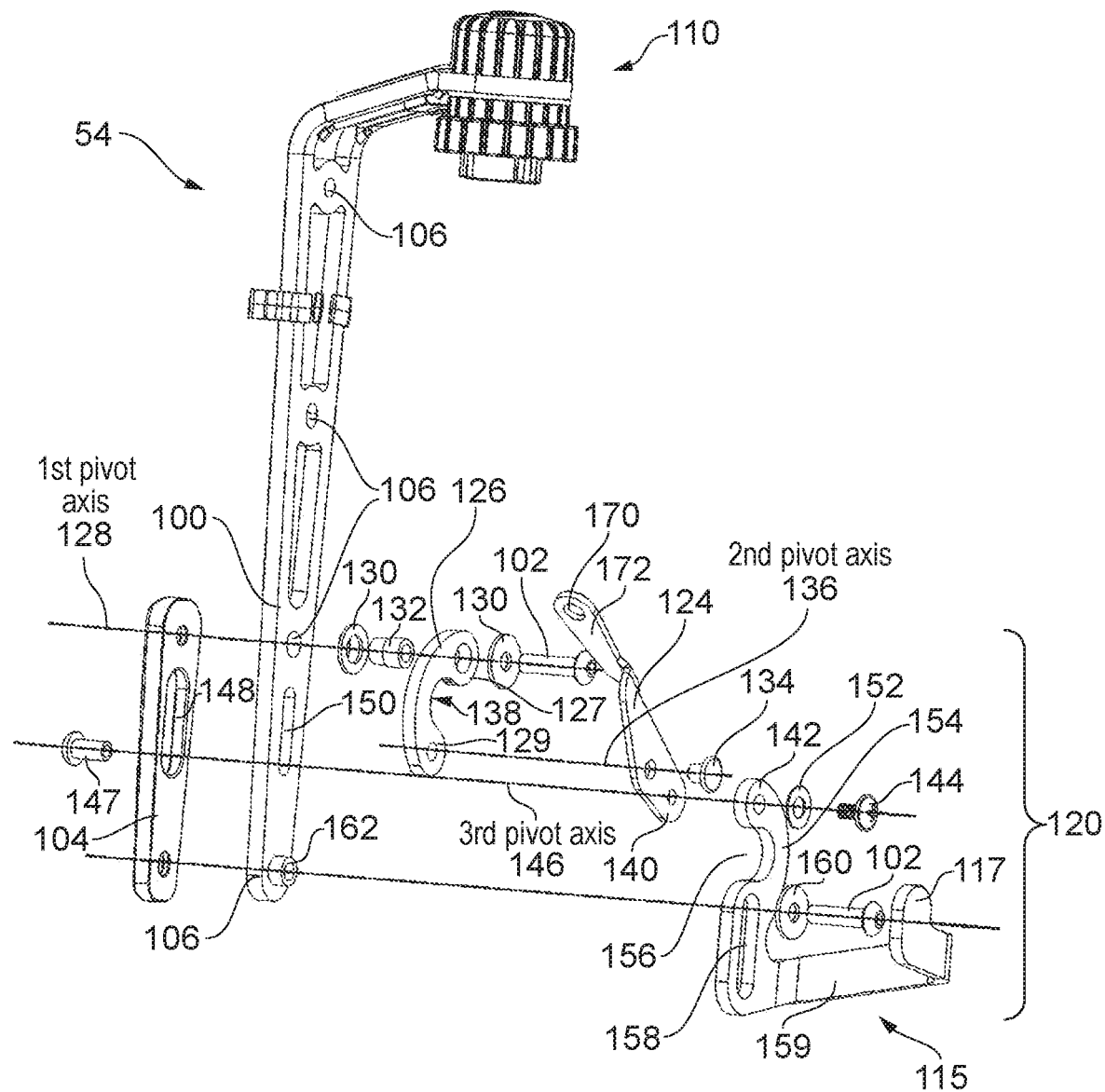
FIG. 5 shows an exploded view showing components of a lever mechanism of the battery holder.

FIG. 5 shows an exploded view of components of the lever mechanism 120, and its interaction with the battery moving portion 115 and spine portion 100. The lever mechanism includes a lever arm 124 and a connecting arm 126. A first end 127 of the connecting arm 126 is connected to the spine portion 100 of the battery holder 54 by a first pivot joint which pivots about a first pivot axis 128. In this example the fixing bolt 102 which fixes the battery holder 54 to the frame also acts as part of the pivot joint between the connecting arm 126 and the spine portion 100. In other examples, if the battery holder is fixed to the frame at one of the other fixing positions then the fixing at the first pivot axis 128 could be separate from the fixing to the frame. One or more washers 130 and/or spacers 132 may be provided at the pivot joint on the first pivot axis 128, to keep the moving parts of the lever mechanism 120 aligned and free to move.

The second end 129 of the connecting arm 126 is fixed to an intermediate point of the lever arm 124 by a fixing 134 forming a second pivot joint on a second pivot axis 136. This fixing does not pass into the spine portion 100. Hence, the connecting arm 126 is free to pivot about both ends of the connecting arm, about the first pivot axis 128 at its first end 127 and about the second pivot axis 136 at its second end 129. The connecting arm 126 has a looping shape, with the axes 128, 136 of the respective pivots separated by an indent 138. The solid body of the connecting arm 126 forms a C-shaped, U-shaped or V-shaped loop around the indent 138 to link the pivot points 128 and 136. Hence, if an imaginary line was drawn between the two pivot points 128, 136 on the connecting arm 126, the line would pass through the indent 138 with the solid portion joining the two pivot points lying to the side of that imaginary line.

One end 140 of the lever arm 124 is connected to an upper end 142 of the battery moving portion 115 by a third pivot joint formed by a fixing 144 passing through holes in the upper end 142 of the battery moving portion and the lever arm 124. The third pivot joint pivots about a third pivot axis 146. The third pivot fixing 144 passes into a corresponding fixing or nut 147, where the head of the fixing or nut 147 fits into a slot 148 within the spacer member 104. The spine portion 100 also has a linear slot 150, which acts as a guide groove for guiding the third pivot axis 146 to slide up and down in a linear direction towards and away from the connector portion 110. Again, a washer 152 or other spacing device may be used at the third pivot to separate the elements by a suitable distance so that they are aligned and free to move.

In this example, the upper portion 142 of the battery moving portion 115, which is connected at the third pivot joint 144, 147, is at the upper end of a looping portion 154 which loops around an indent 156. The indent 156 is shaped to receive the second end 129 of the connecting arm 126. Again, the solid part of the looping portion 154, which joins the upper end 142 of the battery moving portion to a lower part of the battery moving portion that carries the battery engaging hook 117, may be formed as a C-shaped, U-shaped or V-shaped portion which extends around the indent 156 similar to the shape of the connecting arm 126 discussed above. The lower part of the battery moving portion 115 includes a slot 158 which again acts as a guide groove to guide sliding of the battery moving portion. A further fixing 102 passes through this guide groove 158 and through the lower fixing hole 106 in the spine portion and the spacing member 104, again with the inclusion of suitable washers 160 and/or spacing members 162 (although the spacing washer 162 in FIG. 5 is shown abutting against the spine portion 100, it does not need to be integral to the spine, and can be provided as a loose spacer which can be replaced with a spacer of different depth as desired). The fixing of the battery moving portion 115 to the spine 100 through the groove 158 does not need to be a pivoting joint, but should accommodate sliding of the battery moving portion 115 up and down relative to the spine 100. In other examples, it would be possible for the fixing 102 to slide within a groove in the spine, instead of a groove in the battery moving portion 115.

Figure 22:
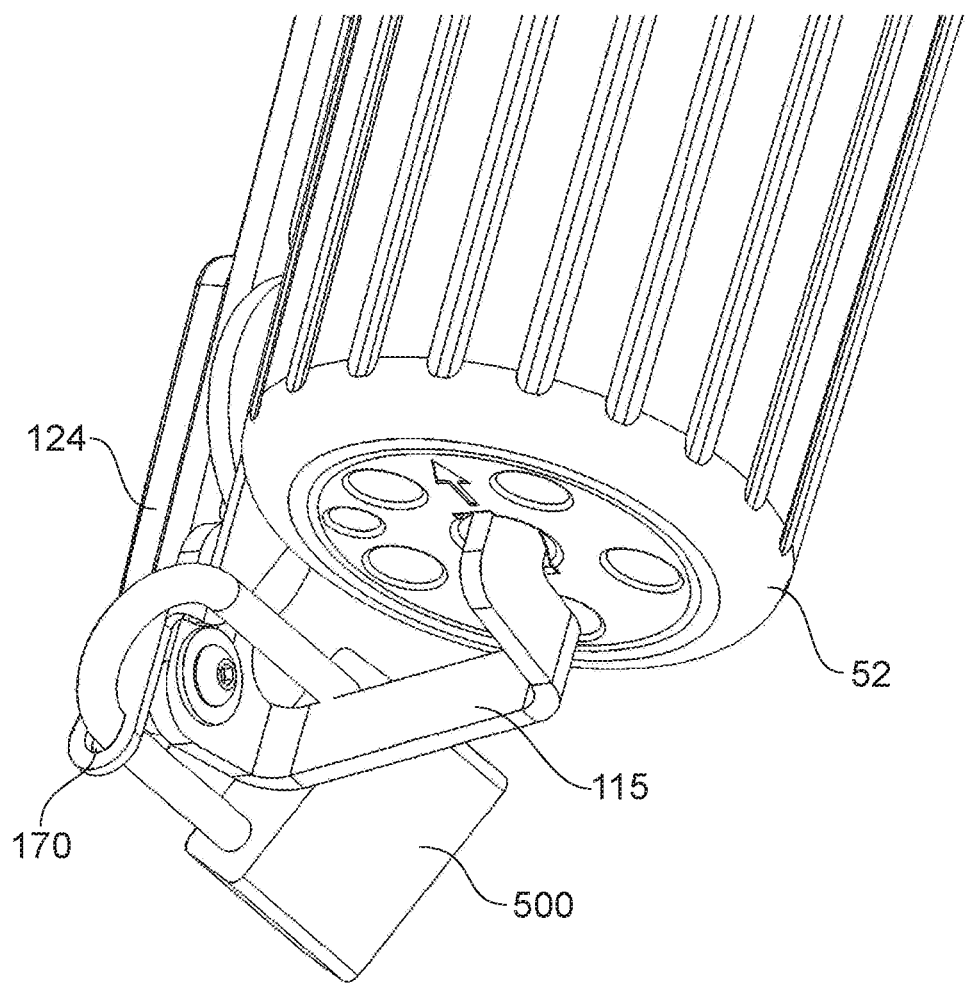
FIG. 22 shows an example of locking the lever arm to another component of the battery holder to prevent displacement of the lever arm.

The battery moving portion includes an extending arm 159 which extends outwards away from the spine portion 100, with the spacing of the extending arm corresponding to the spacing of the connector portion 110 from the spine 100 by the neck portion 112 of the cage, so that in this example the battery engaging hook 117 is positioned to be aligned with the centre of the connector portion 110, so that when the battery pack is fitted onto the hook 117, linear sliding of the battery moving portion upwards brings the battery pack into aligned engagement with the connector. When viewed side on, in a direction perpendicular to a plane aligned parallel to the extending arm 159 of the battery moving portion, there is an angle of less than 90 degrees between the extending arm 159 and the part of the battery moving portion 115 which is parallel to the spine 100 (this acute angle can be seen more clearly in FIG. 13). Hence, the extending arm is angled upwards. This improves structural strength. Also, as cycle frames are also angled like this at the bottom, this allows the battery holder to be fitted lower down on the cycle frame, without contacting the seat tube 6 for example. Also, this means that when the battery pack is held, there is a gap between the base of the battery pack and the extending arm 159, which allows a padlock to be inserted through the gap as shown in FIG. 22 described below.

The Figures show an example where a single battery engaging hook 117 is provided, which is aligned centrally with respect to the connector portion. However, another approach could be to provide two or more battery engaging hooks 117, which engage with respective slots in the battery pack positioned on either side of the centre of the circular end cap of the battery pack, at positions lying on the diameter of the battery pack end cap. With this approach, the battery engaging hooks 117 are positioned to allow tilting of the battery pack in the same direction as the direction of tilting with a single battery engaging hook 117. For example, compared to the central position of a single hook 117 as shown in the side view of FIG. 13, instead two hooks may be positioned on either side of that central position (e.g. at positions A and B as shown in dotted lines in FIG. 13). The two or more hooks 117 may be centred on the plane which is traced out by the third pivot axis 146 as it slides up and down towards and away from the connector portion 110. Providing the two battery engaging hooks on this plane ensures the battery pack is supported centrally with respect to the connector portion 110.

The lever arm includes a locking hole 170 for receiving a lock, as will be discussed below with respect to FIG. 22. The locking hole 170 is provided at an end of a handle 172 which is at the opposite end of the lever arm 124 from the end 140 which is coupled to the upper end 142 of the battery moving portion 115 at the third pivot axis 146.

The functioning of the lever mechanism 120 will be discussed in more detail below with examples showing different positions of the lever mechanism when in use with the battery pack present.

Figure 6:
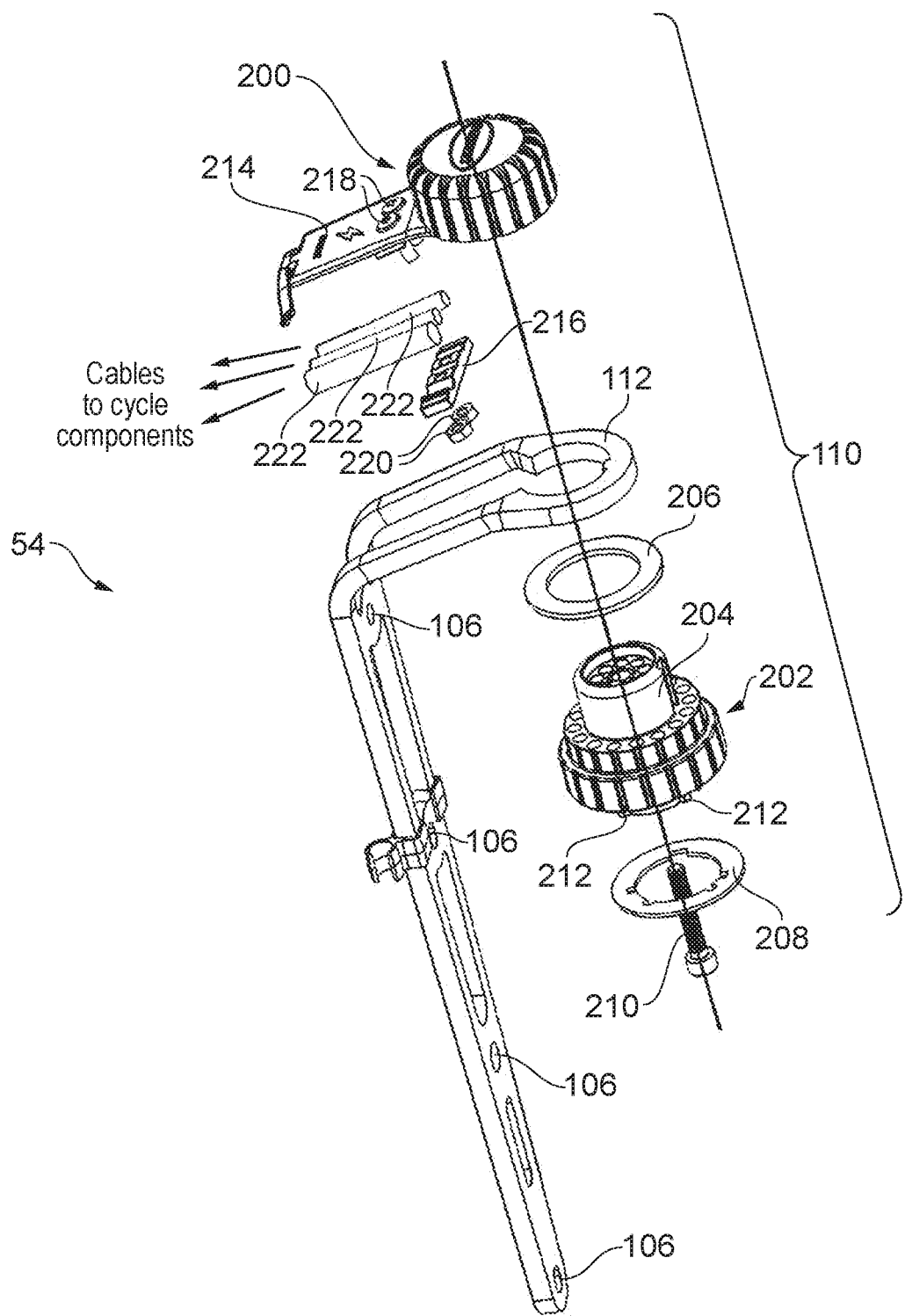
FIG. 6 shows an exploded view showing components of a connector portion of the battery holder.

FIG. 6 shows an exploded view of components of the connector portion 110 for interfacing with a connecting interface at the top of the battery pack. The connector portion includes a cover 200 which covers the top of the connector 110 and protects the electrical components inside the connector from dirt, dust, water, etc.

A connector housing 202 houses the connector pins for engaging with corresponding sockets in the battery pack 52. The pins are not visible in the view shown in FIG. 6, as they are hidden by the outside of the connector housing 202. A tubular part 204 of the connector housing 112 passes through a washer 206 made from rubber or other resilient deformable material and through the neck 112 of the battery holder into the dust cover 200. A second washer 208 fits on the other end of the connector housing 202 (the end opposite the end having the tubular portion 204) and the second washer 208 is also made of rubber or other resilient deformable material. In use, the first washer 206 is compressed between the neck 112 of the holder and the connector housing 202 when the battery pack is inserted and engaged with the connector, while the second washer 208 is compressed between the connector housing 202 and the battery pack 52 itself. Both washers enable a secure clamping of a battery pack in the holder, due to the compressibility and resilience of the washers 206, 208, and also provides spacing to accommodate manufacturing tolerances. The second washer 208 which is on the end of the connector housing 202 to compress against the lip of the battery pack itself also acts as a water seal. A fixing 210 fixes the connector housing 202 to the dust cover 200 with the first washer 206 and neck 112 fastened between the housing 202 and dust cover 200. The fixing 210 passes into a fixing hole (not visible in FIG. 6) within the inside of the dust cover 200.

As shown in FIG. 6, but more easily visible in FIG. 4, the lower end of the main connector portion 202 may have a series of ridges 212 disposed around its circumference, in a pattern which is rotationally asymmetric. These ridges are designed to engage with corresponding slots within the connecting interface of the battery pack as discussed below. By providing a rotationally asymmetric pattern of ridges, this can prevent the battery being inserted in the wrong orientation which could otherwise damage the battery pack or the connector. The inner circumference of the washer 208 has a profile which corresponds to the shape of the ridges 212 so that the washer 208 can fit over the ridges. It will be appreciated that the precise shape of the ridge pattern shown in FIGS. 4 and 6 is just one example.

As shown in on the top part of FIG. 6, the cables 222 for connecting to various components of the cycle such as the motor 58, lights 84, cycle computer 80 etc. may be partially hidden by an extension 214 of the dust cover 200 as they exit the connector. The cables may be gripped between the extension 214 of the dust cover 200 and a gripping bar 216, and held in place using fixings (e.g. screw top bolts) 218 and nuts 220. The cables 222 are shown truncated in FIG. 6 but it will be appreciated that these in fact continue on out of the battery holder and then can be run along the frame to whichever components are to be powered using the battery. Also, the ends of the cables may pass into sockets within the tubular part 204 of the connector housing 202 where the cables are electrically connected to the pins for engaging with the battery pack.

Figure 7:
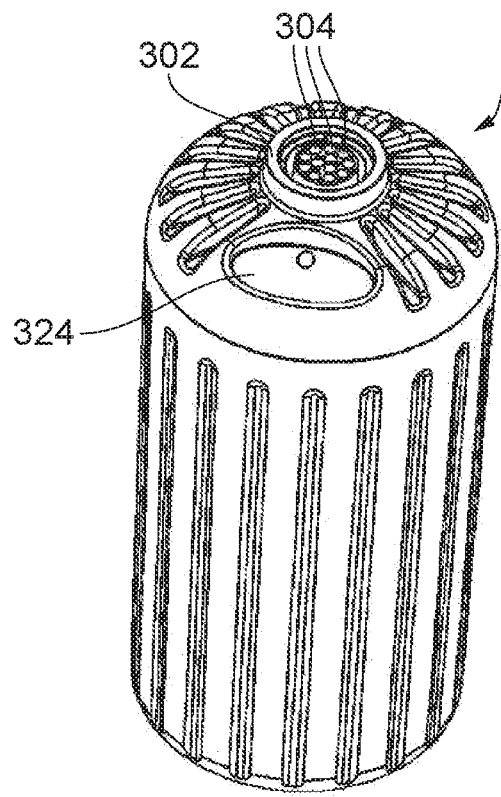
FIGS. 7 to 9 illustrate different views of a battery pack for use with the battery holder.
Figure 8:
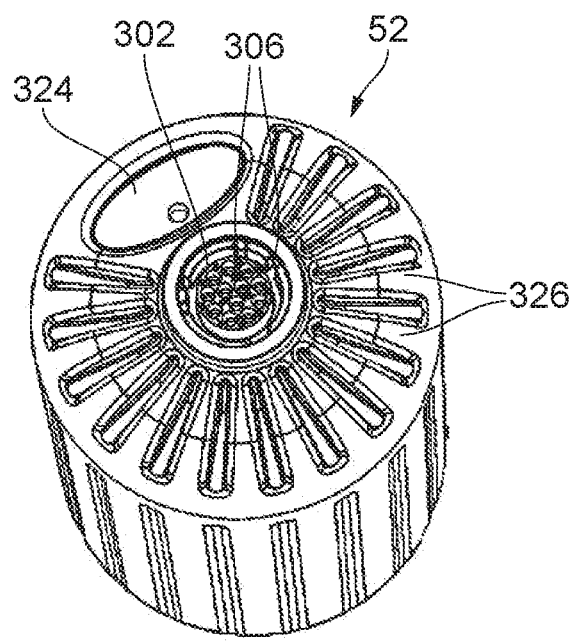
Figure 9:
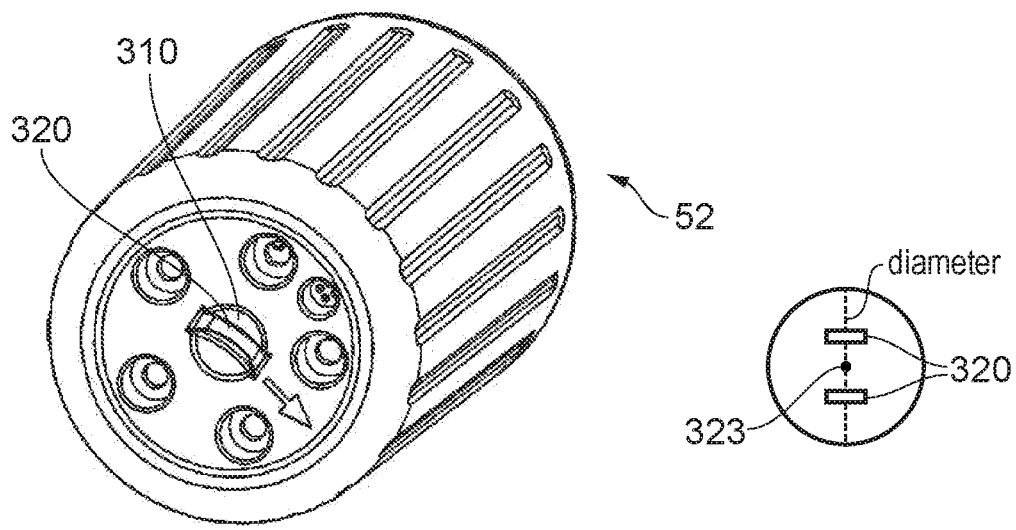

FIGS. 7 to 9 show an example of the battery pack 52 designed for use with the battery holder 54 described above. FIGS. 7 and 8 show the battery pack 52 from above (with the connector interface 302 for engaging with the connector portion 110 of the holder 54 visible), while FIG. 9 shows the battery pack 52 from below showing the base of the casing for engaging with the battery engaging hook 117 of the battery moving portion 115 of the holder 54.

As shown in FIG. 9, the base of the battery casing has an indented portion 310 which has a hemispherical profile. Also within the hemispherical indent is a slot portion 320. When the battery pack 52 is inserted into the battery holder 54, the battery engaging hook 117 of the battery holder 54 engages with the indent 310 of the battery pack 52 to centrally position the battery pack 52 relative to the holder 54. Since the indent curves inwards, the user can easily find the indent and the indent will guide the battery pack into the centre of the battery holder. To help with this, the area surrounding the indent may also taper inwards towards the indent, e.g. with a conical shape.

As shown in FIG. 4, the battery engaging hook 117 has a curved end surface 315 so that the hook 117 can slide along the curved inner surface of the slot 320 at the centre of the indent 310 of the battery pack 52, to allow the battery pack to be tilted into the battery holder from an angled position to an aligned position (see FIGS. 10-13). Also, when viewed from the side the hook 117 has a flat profile which engages with the slot 320 in the battery pack 52 to align the battery pack in a desired orientation. The slot portion 320 of the battery can be aligned such that when the hook 117 is in the slot 320, the battery will be in one of two orientations possible with respect to the connector portion 110. If only one of these orientations is suitable for connecting the connector portion 110 to the battery pack 52, then another indicator can be provided to provide the correct orientation. For example, as shown in FIGS. 7 and 8, the top cap of the battery pack may have an asymmetric design with for example a makers label 324 on one side of the cap. The user may be instructed that when the battery pack is fitted in the correct orientation, the makers label 324 should point to one side of the frame and not the other, so that the user knows that, when the hook 117 is in the slot 320 of the battery pack 52, then provided that the label 324 on the top of the battery pack is pointing in the right direction then the battery will be correctly aligned. Hence, when inserting the battery, after the hook 117 is located in the indent 310 in the battery pack, the battery pack merely needs to be twisted a little until the engaging hook 117 drops into the slot 320, which provides tactile feedback that it is in position (the slot 320 is indented a little deeper than the hemispherical indent 310).

While FIG. 9 shows an example with a single indent 310 and slot 320 at the centre of the circular end cap, another approach (as shown in the diagram on the right hand side of FIG. 9) can be to provide two or more such indents/slots at points either side of the centre 323 of the circular end cap, with each slot 320 having its centre point on a diameter of the circle, and the longer edge of each slot 320 (when viewed in plan view along an axis parallel to the central axis of the battery pack) being perpendicular to the diameter of the circle, so that the battery can still be tilted into position as described below.

FIGS. 7 and 8 show the top cap of the battery pack 52 in more detail. In this example, the top cap includes the label portion 324 which may be used to ensure the correct orientation of the battery, but in other examples the orientation indicator could be another feature such as a marking, sticker, ridge or other visually noticeable feature provided on one side of the battery pack. In this example, the label portion 324 also includes one or more LEDs (light emitting diode) for signalling information to the user, such as whether the amount of remaining charge in the battery is low. For example, a cluster of LEDs of different colours may be provided. In other examples, the LEDs may be located on a different part of the battery pack 52. Also, other methods of providing an indication of the remaining charge could be used, e.g. a low energy reflective display (similar to e-reader or digital paper displays) which displays the remaining charge numerically. The top cap of the battery pack is die cast from aluminium or another metal or alloy, so that it acts as a heat sink portion for dissipating heat from within the battery casing. The cap has a number of heat radiating fins 326 which extend outwards from the centre of the cap, providing increased surface area to improve heat dissipation. Forming the top cap as a heat sink is useful to prevent overheating of a control unit (which may comprise a motor drive) 60 (e.g. microcontroller on a printed circuit board) located inside the casing of the battery pack 52.

The connecting interface 302 provided on the top cap of the battery pack 52 includes a number of sockets 304 corresponding in position to the pins in the main connector housing 202 of the connecting portion 110. Also the connecting interface 302 includes slots 306 disposed about the circumference of the battery pack, at corresponding positions to the ridges 212 on the lower part of the connector housing 202. This means that when the battery is in the correct orientation then it engages with the connecting portion 110 so that the pins in the connector housing 202 pass into the sockets 304 within the connecting interface 302 to form an electrical connection between the cabling 222 and the battery and/or controller 60 within the battery pack 52.

FIGS. 3, 4, and 10 to 22 illustrate an example of the battery holder when in use for inserting, securing and locking a battery. Initially, before the battery pack is inserted, if not already so positioned, the lever arm 124 is moved to a first position as shown in FIGS. 3 and 4. This causes the battery moving portion 115 to be in an open state where it is positioned at its furthest point away from the connecting portion 110, so that it provides clearance for the battery pack to be inserted into the holder. When in this position, the fixing 102 which fixes the battery moving portion 115 through the slot 158 to the spine 100 is at the upper end of the slot 158 as viewed in FIG. 3. Also the fixing 144, 147 (which passes through the upper part 142 of the looping portion 154 of the battery moving portion 115 and through the end 140 of the lever arm 124 at the third pivot axis 146) is at the lower end of the slot 150 in the spine 100 of the battery holder, when the lever arm is in the first position as shown in FIGS. 3 and 4.

As shown in FIGS. 10 and 11, the battery pack 52 can then be inserted into the holder so that the indent 310 at the base of the battery is placed over the battery engaging hook 117. The battery is rotated until the hook 117 drops into the slot 320 in the base of the battery pack, with the orientation indicator 324 pointing to the correct side as discussed above.

Initially the battery is inserted into the holder in a tilted position as shown in FIG. 10 and FIG. 11, where the battery pack is tilted to one side of the holder relative to the spine portion 100 which runs along the frame of the cycle (it will be appreciated that the spine itself may be at an angle relative to the ground, when fitted on the down tube 10 of a frame 4 for example).

Figure 12:
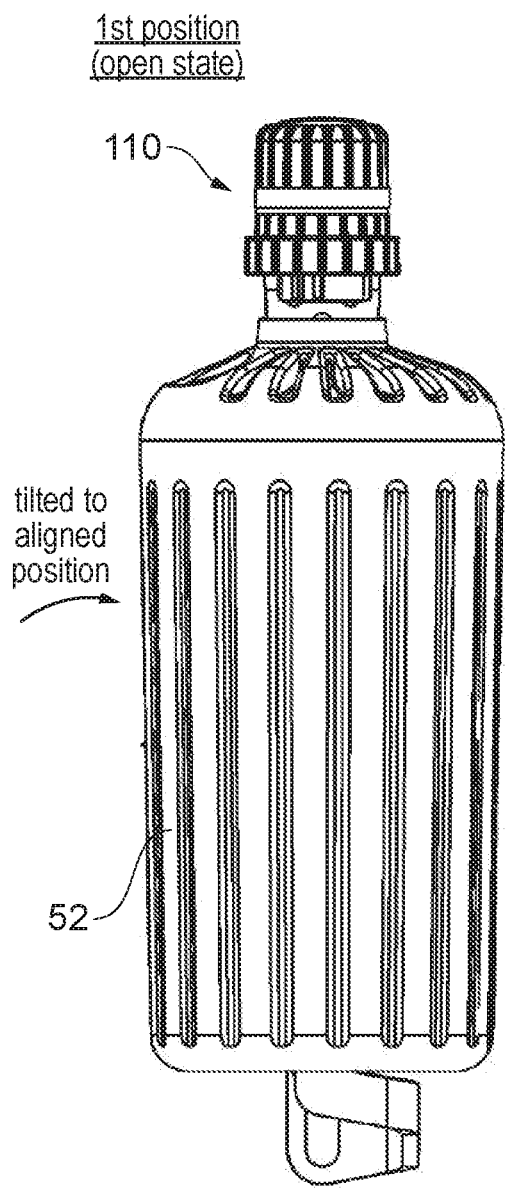
FIGS. 12 and 13 show the battery pack in an aligned position ready for engagement with the connector portion, while the battery moving portion is in an open state and a lever arm is in a first position.

As shown in FIG. 12, the user can then rotate the battery pack relative to the engaging hook 117 on the battery moving portion 150, so as to move the battery pack to an aligned position where it is aligned with the spine 100 of the battery holder 54 ready for engaging with the connector portion 110. The semi-circular profile of the indent 320 in the battery pack and the corresponding semi-circular profile of the battery engaging hook 117 means that it is easy for the user to tilt the battery pack into the correct orientation while the battery pack remains engaged with the hook. This ensures that the battery pack is easily aligned with the connector as the hook remains in contact with the battery pack throughout its rotation, so that the user does not need to re-find the correct alignment/orientation of the battery pack. The position of the hook 117 relative to the connector means the battery is aligned centrally relative to the connector and the orientation of the battery relative to the connector will automatically be correct when the hook 117 is aligned with the slot 320 and the orientation indicator 324 is pointing to the correct side. Hence, it is very easy for the user to insert the battery and find the correct alignment.

Figure 13:
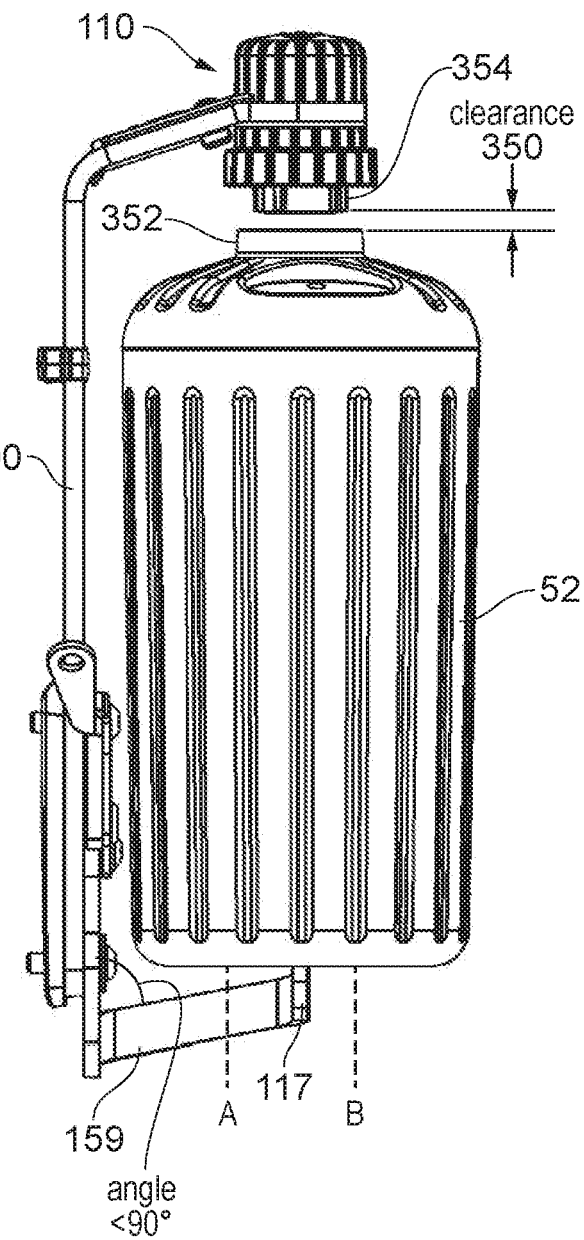

Also, the tilting action means little clearance is needed for positioning the battery in the correct location. As shown in FIG. 13, when the battery pack is swung into the aligned position, the clearance 350 between the upper lip 352 of the battery pack 52 and the lower edge 354 of the connector housing 202 may be relatively small. For example the clearance may be less than 5 mm, or could even be as small as 1-2 mm, and in some cases less than or equal to 1 mm. The design of the engaging hook 117 and indent 320 is such that the user can easily align the battery without needing visual line of sight into the region between the connector 110 and the connecting interface 302 of the battery 52, so there is no need for a large clearance. Also, in practice a small clearance is beneficial because not only does this reduce the margin for misalignment as the battery swung into position and engaged with the connector, but also by reducing the clearance to the minimum possible this allows the battery to fit into a confined space as there is no need for an excessive margin of spare space either side of the battery to accommodate the connecting operation. This can be particularly useful for a battery holder provided with a retrofittable kit as discussed above.

Having tilted the battery into the aligned position as shown in FIGS. 12 and 13, the user is now ready to use the lever mechanism 120 to cause the battery pack 52 to be engaged with the connector portion 110 and hence form an electrical connection. During this process of engaging the battery pack with the connector, the connector portion 110 may remain static relative to the spine portion 100 of the holder 54, so the connector does not move. This is useful because it makes the cabling 222 neater, avoids the need for extra spare loops of cabling to accommodate movement of the connector and provides much greater flexibility for a different layout of electrical components on the cycle as these do not need to take into account any freedom of movement needed for cables which would be required for a moving connector portion.

Figures 14, 15:
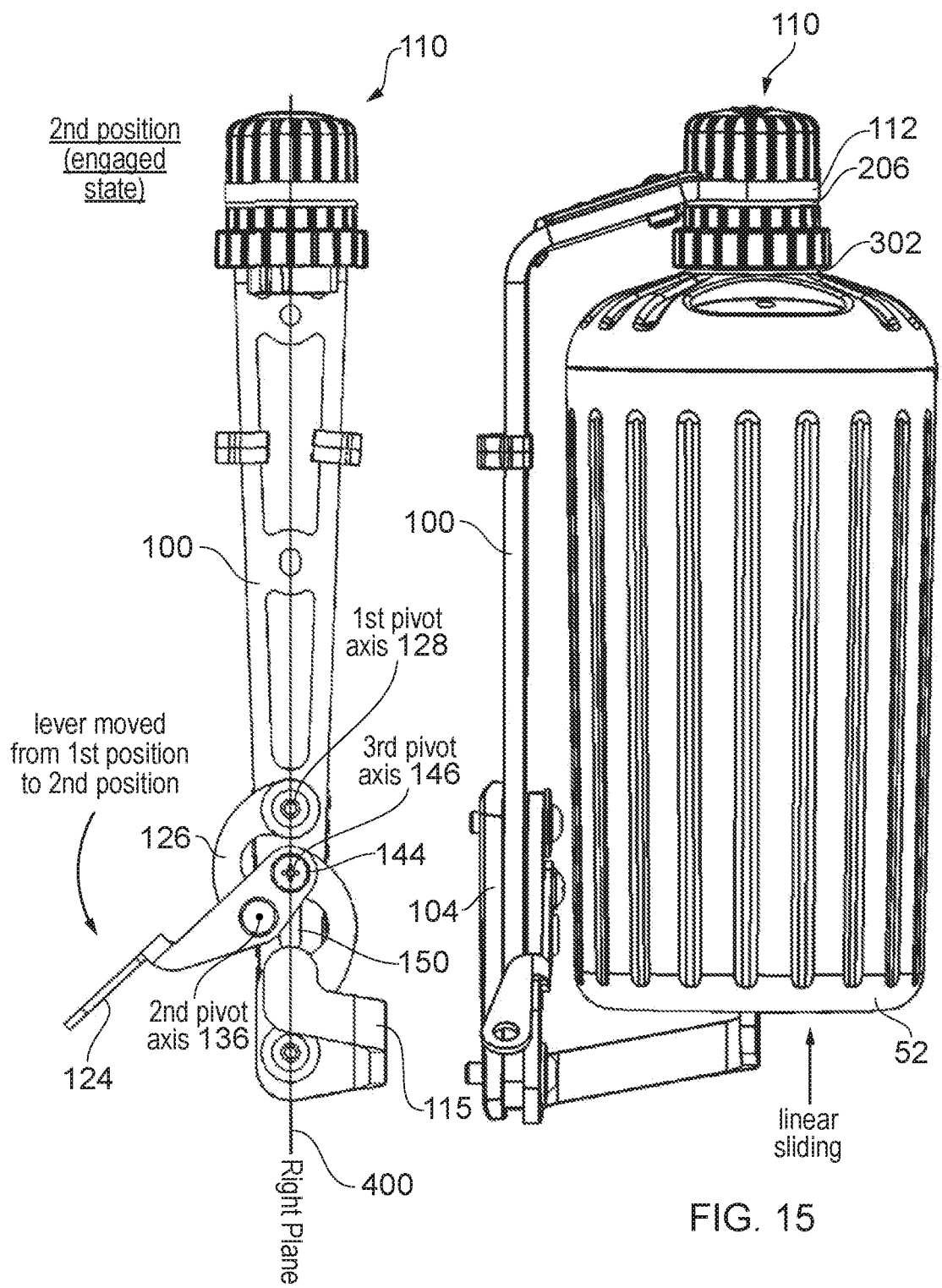
FIGS. 14 and 15 show views, without and with the battery pack respectively, of the battery holder with a lever arm in a second position and the battery moving portion in an engaged state.

To form the electrical connection, the user moves the lever arm 124 from the first position shown in FIGS. 3, 4, 12 and 13 to a second position as shown in FIGS. 14 and 15. This causes the system of interconnected pivots joints on axes 128, 136, 146 to raise the fixing 144 (which passes through the battery moving portion 115 and the lever arm 124 at the third pivot axis 146) to rise up through the slot 150 in the spine portion 100. This lifts the battery moving portion 115 upwards to slide it linearly towards the connector portion 110. The grooves 158, 150 ensure that the motion of the battery moving portion 115 is in a linear direction, to ensure the battery 52 remains in alignment with the pins of the connector 110 when the battery is being slid up towards the connector 110.

Hence, when the battery is present, as shown in FIG. 15, moving the lever from the first position to the second position causes the battery pack to slide upwards in a linear direction so that the connecting interface 302 of the battery pack engages with the main connector portion 202 within the connector 110 on the battery holder 54. The ridges 212 on the connector housing 202 engage with the slots 306 in the battery connector interface 302, and the connector pins within the connector 110 engage with the sockets 304 in the battery pack 52. Although the lever arm 124 provides a lever advantage (multiplying the force applied by the user on the lever arm 124 to provide a greater force for lifting the battery pack towards the connector), counter-intuitively this multiplied force from the lever arm 124 does not tend to cause damage of the connector pins in the connector socket as the battery pack is brought into engagement. Firstly, when the battery holder is fitted so that the connector portion 110 is at the upper end of the holder and the battery moving portion 115 is positioned below the connector portion 110, the weight of the battery pack 52 under gravity will tend to counteract the force applied by the lever mechanism, so that there is less chance of damage. Also, the alignment provided by the relative positioning of the engaging hook 117 and connector portion 110 and the cooperating shapes of the engaging hook 117 and base of the battery pack, and the limited clearance 350 at the point when the battery is first inserted, mean there is little chance for the battery pack to drift away from the correct alignment with the pins so there is less chance of the battery pack impacting the pins to cause damage.

FIGS. 14 and 15 show the position when the battery first engages fully with the pins of the connector, which is reached when the lever arm reaches the second position as shown in FIG. 14. The sliding of the battery moving portion 115 compresses the washer 208 between the battery pack 52 and the connector housing 202 and compresses the washer 206 between the neck 112 and connector housing 202, to provide a clamping force and to seal the battery against water entering the casing.

When the lever arm 124 is in the second position, the axis 136 of the second pivot joint between the connecting arm 126 and the lever arm 124 is on one side of a plane 400 which corresponds to the plane that would be traced out by the third pivot axis 146 as the third pivot joint 144, 147 slides up and down the spine portion 100 within the groove 150. The plane 400 passes through the first pivot axis 128 and the third pivot axis 146. When the lever arm 124 is in the second position, the second pivot axis 136 is still on the same side of the plane 400 as the side on which it started when the lever arm was in the first position as shown in FIG. 3. This means the lever mechanism 120 is not yet in a retained state where the lever mechanism provides resistance to removal of the battery. When still in the second position as shown in FIGS. 14 and 15, the prevailing forces acting on the battery and the lever mechanism may be such that the weight of the battery and any forces knocking the battery moving portion 115 will tend to cause the battery moving portion 115 to move away from the connector portion 110 and will cause the lever to move back towards the first position. This is because the lever has not yet moved across a centre position beyond which it resists removal of the battery as discussed below. Hence, in the state shown in FIGS. 14 and 15, although the electrical connection has been formed, the battery is not yet securely retained in the holder.

As shown in FIGS. 16 and 17, by continuing to rotate the lever arm from the second position shown in FIG. 14, the lever reaches a centre position at which the second pivot axis 136 lies directly on the plane 400 traced out by the third pivot axis 146 during its sliding, so that all three pivots 128, 146, 136 are aligned on the plane 400. This is the point at which there is greatest compression of the washers 206, 208 and battery pack 52 between the hook 117 of the battery moving portion 115 and the connector portion 110.

Continuing to move the lever from the centre position shown in FIG. 16, the user pushes the lever to a third position as shown in FIGS. 20 and 21, when the lever arm 124 comes to rest against a stop surface, which in this example is the edge of the moving portion 115, but could also in some examples be a surface of the spine member 100 or a separate pad fastened to the spine portion 100, or any other solid object against which the lever can rest. When the lever arm is in the third position, it sits flush against the stop surface of the spine and so there is reduced likelihood of movement of the lever, and also the lever arm is substantially parallel to the spine 100 and so does not stick out or become an obstacle for cycling.

FIG. 21 shows a view of the holder 54 in the third position, but with the lever arm hidden to show the positions of the connecting arm 126 and the looping part 154 of the battery moving portion 115 when the lever arm is in the third position. At this point, the second pivot axis 136 (of the pivot joint between the second end 129 of the connecting arm 126 and the intermediate part of the lever arm 124) has passed beyond the plane 400 so that it is now on the opposite side of the plane 400 to the side on which it started when the lever arm was in the first or second position as shown in FIG. 3 or 14. Once the second pivot axis 136 has passed beyond the plane 400, the lever mechanism is in a retained state because the prevailing forces acting on the lever mechanism will be such that the weight of the battery 52, or any knocks to the battery moving portion 115, will tend to cause the lever mechanism to be urged away from the centre position shown in FIG. 16. Since the lever cannot move beyond the stop in the third position this means the battery is securely retained in the holder and resists removal of the battery.

Figure 18:
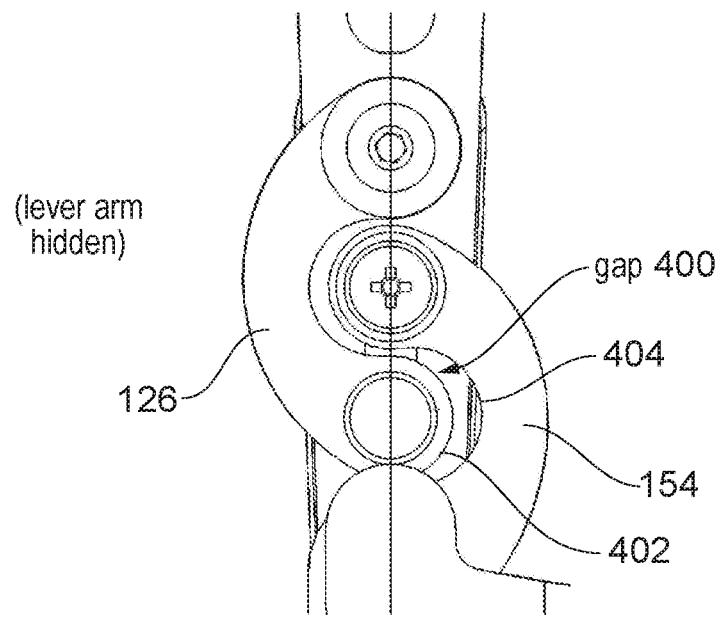
FIGS. 18 and 19 show views of a portion of a lever mechanism when in the centre position.
Figure 19:
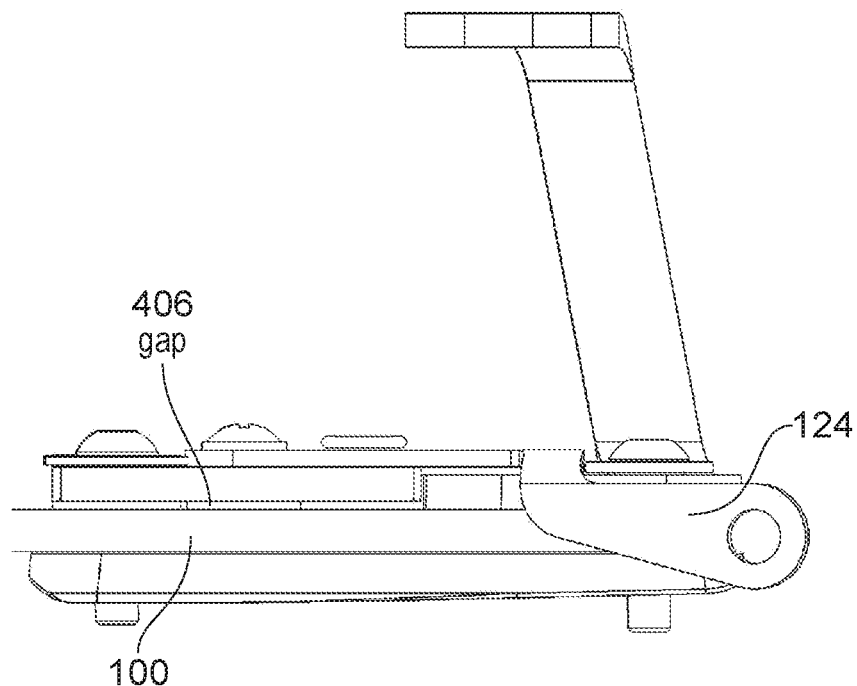

Hence, the lever mechanism provides an over-centre mechanism which uses the alignment of forces imparted on the mechanism to provide the retention, rather than requiring an interference for example. FIGS. 18 and 19 show views of the lever mechanism from above and from the side, when at the centre position. In FIG. 18, the lever arm 124 has been hidden to show the positions of the connecting arm 126 and looping portion 154 of the battery moving portion 115. As shown in FIG. 18, at the centre position there may be a gap 400 between the opposing surfaces 402, 404 of the end of the arm 126 and in the indent 156 of the looped portion 154 of the battery moving portion 115. Also, as shown in FIG. 19 there may be a vertical gap 406 between the spine 100 and the connecting arm 126, similarly there may be vertical gaps between other elements such as between the lever arm 124 and connecting arm 126 or between the connecting arm 126 and battery moving part 115 (spacers or washers could be included to maintain the desired vertical gaps). The moving parts of the lever mechanism 120 only need to touch at the pivot points 128, 146, 136, and surfaces further from the pivot points can be non-touching, to reduce friction and make the mechanism easier to fasten and unfasten and to reduce maintenance.

Hence, this design of battery holder 54 makes the fastening of the battery into the holder much easier for the user, who requires less strength to actuate the lever mechanism than with alternative retention mechanisms. This is partly due to the use of the over-centre mechanism which avoids the need for surfaces to be compressed against each over with a frictional fit to provide clamping, and also due to the use of the lever arm 124 which provides a lever advantage so that the force exerted on the battery by the battery moving portion 115 can be greater than the force imparted by the user onto the lever arm 124.

Throughout the motion of the lever arm from the second position shown in FIG. 14 to the third position shown in FIG. 20, the connecting interface 322 of the battery pack 52 may remain engaged with the pins in the connector portion 110 of the holder. Hence, the pins may engage with the battery before the second pivot axis 136 has passed across the central plane 400, which is the point at which there is greatest compression force on the battery and greatest reaction force on the holder. By ensuring that the pins are already engaged before passing across this point of greatest compression this reduces the chance that damage to the pins is caused by the mechanism. Continued motion of the lever to the third position shown in FIG. 20 then ensures the battery's retention by making the second pivot axis 136 cross the plane 400 to the other side, at which point it is not possible to remove the battery pack unless the lever arm is moved back towards the second position so that the second pivot axis 136 again crosses the plain 400 back to the side on which it started when the lever was in the first position. Nevertheless, the battery is in the engaged state throughout each of the second, centre and third positions of the lever, although there may be variation in the clamping compression applied by the battery moving portion 115 due to slight adjustments of position of the battery moving portion 115 as the lever mechanism passes the centre position.

Also, the mechanical advantage from pushing the lever 124 is limited when moving the lever from the first position to the second position (of engagement between the battery pack 52 and connector portion 110). As the lever arm 124 moves from the first position to the second position, the lever advantage mainly results from the lever advantage represented by the ratio of the distance between the second pivot 136 and the point at which the user presses on the lever and the distance between the second and third pivots 136, 146. This is because in this part of the movement, the second pivot 136 is mainly to the side of the third pivot 146, and the connecting arm 126 moves little. However, once the battery pack is engaged, in the later stages of lever movement the second pivot axis 136 moves significantly across in a circular motion below the third pivot 146, so a large movement of the lever only produces a small linear movement of the battery moving portion 115, thus creating a much larger mechanical advantage for the purpose of clamping. In the final stage of the lever motion (from the second position to the third position), most of the force caused by the lever movement goes into the swinging movement of the connecting arm 126 rather than linear movement of the battery moving portion 115.

As shown in FIG. 22, when the lever arm is in the third position and the battery pack 52 is retained within the holder, a padlock or other locking member can be passed through the locking hole 170 in the lever arm 124. For example, the padlock 500 may pass through the loop of the battery moving portion 115 between the spine 100 and the battery pack 52. This prevents the lever arm 124 being moved away from the third position, so that it is not possible for the battery pack 52 to be removed from the holder until the padlock 500 is removed. This provides a deterrent against opportunist thieves.

The above examples provide secure retention of the battery pack 52 into the holder 54 when the lever arm 124 has been moved to the third position (a position in which the over-centre mechanism has passed beyond the centre position). This generally works well for most users. However, if the user accidentally fails to move the lever arm fully beyond the centre position, or accidentally knocks the lever arm away from the third position (e.g. when carrying out an action on another component of the cycle which is near the battery holder), and then rides the cycle with the lever arm in an incorrect position on or beyond the centre position, there could be a risk that the battery pack 52 could be dislodged in some scenarios.

Figure 23:
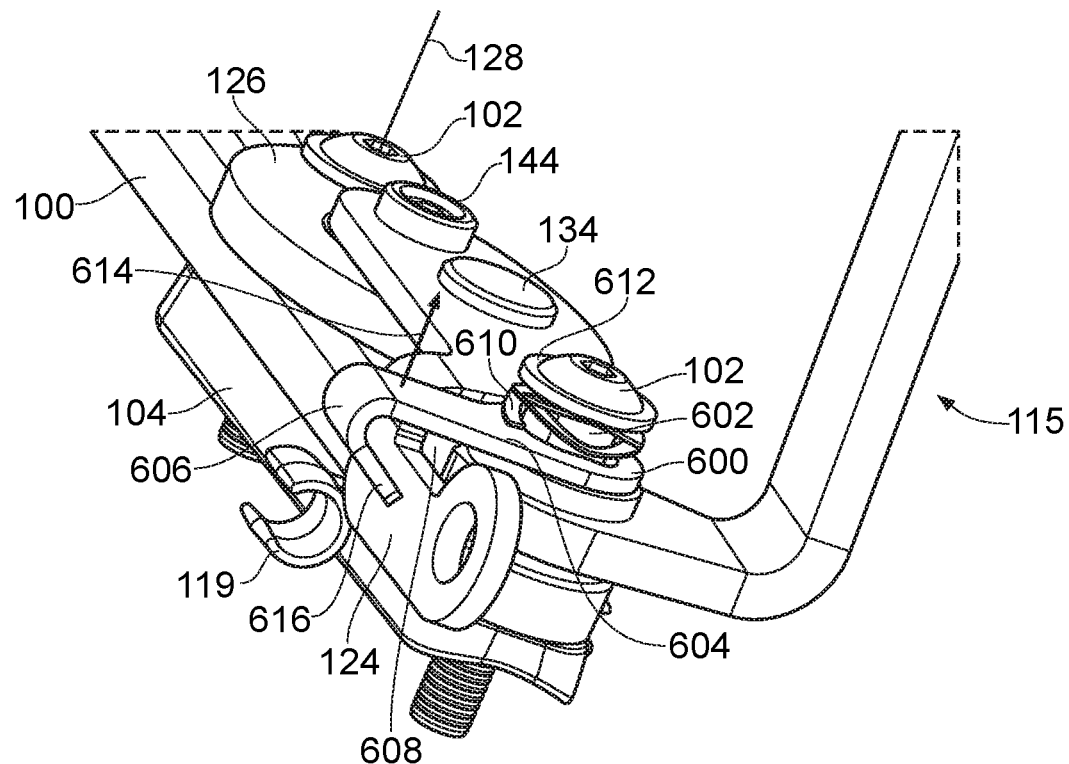
FIG. 23 illustrates an example in which a catch member is provided to resist the lever arm being displaced.
Figure 24:
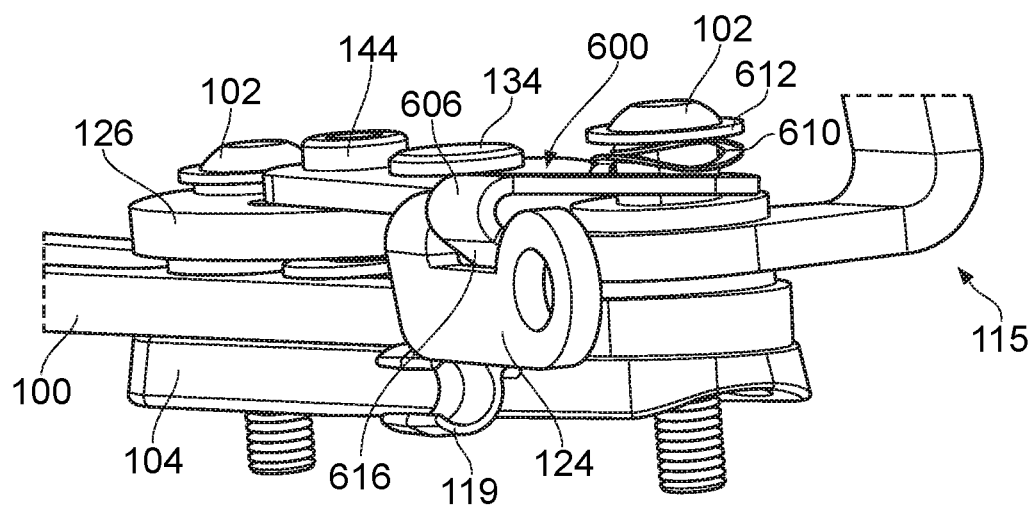
FIG. 24 illustrates how when moving the lever arm to secure the battery pack into position, the catch member is displaced by the movement of the lever arm to allow the lever arm to pass beyond the catch member, before the catch springs back to retain the lever arm.

Therefore, while not essential, to provide added protection against the battery pack being released while the cycle is in motion, as shown in FIGS. 23 and 24 a catch member 600 may be provided which, when in a catching position, resists displacement of the lever arm 124 when the lever arm is in the third position or another position in which the lever mechanism is in the retained state. The catch member 600 fits around the fixing at the lower end of the battery holder that fixes the battery moving portion 115 to the spine 100. In this example, this fixing is the bolt 102 which also fixes the battery holder to the cycle frame. For ease of explanation, subsequent references to this fixing refer to the bolt 102. However, for some cycle frame designs space constraints may require the bolt fixing the holder 54 to the cycle frame to be at a different position on the holder, and in that case the fixing at the lower end of the holder which supports the catch member 600 may be separate from the bolt that fixes the holder 54 onto the cycle frame. For example, the fixing may be a shorter bolt which passes through the battery moving portion 115 and the spine 100 but does not extend on into the cycle frame.

The bolt 102 sits within a sleeve which has an external cross-section with flattened side surfaces 602 in the portion of the sleeve where the catch member 600 is located. The bolt 102 and surrounding sleeve pass through a slot in the catch member 600 which has corresponding flattened inner surfaces, so that rotation of catch member 600 about the axis of the bolt 102 is prevented.

The catch member 600 includes an extending arm 604 which extends outwards from the bolt towards the lever arm 124, and a hook portion 606 for retaining the lever arm 124. The lever arm 124 includes a cutout 608 to make it easier for the lever arm 124 to pass the catch member 600 when the lever arm 124 being moved by the user. The catch member 600 is biased towards the catching position. In this example, the biasing is provided by a spring 610 provided around the bolt 102, which pushes up against a flange 612 or washer provided at the head of the bolt 102. The example of FIG. 23 shows a flange 612 which is integrally formed as part of the bolt 102, but other examples could use a washer which is a separate component to the bolt. It will be appreciated that the biasing could also be provided in other ways, e.g. by providing a catch member 600 which flexes so that the biasing is provided by the material of the catch member 600 itself. In this case, a spring 610 may not be essential.

FIG. 23 shows the catch member when in the catching position, when the lever mechanism is in the retained state, and the hook portion 606 extends over the lever arm 124 to resist displacement of the lever arm 124. While the catch member 600 may allow some movement of the lever arm 124 in this position, the catch member 600 prevents the lever arm 124 being moved beyond the centre position. The spring 610 acts to retain the catch member 600 in this position. Hence, even if the user knocks the lever arm accidentally, the catch member 600 prevents the lever arm 124 being moved beyond the centre position, so that when the user subsequently rides the cycle, the battery pack 52 is still securely fastened in the holder 54.

When the user wishes to release the battery pack 52 from the holder 54, the user can press upwards on the hook portion 606 of the catch member 600, which causes the catch member 600 to move up in the direction shown by arrow 614 in FIG. 23, compressing the spring 610 on the side of the bolt 102 facing the hook portion 606 (the spring may be less compressed on the opposite side of the bolt 102). The lever arm 124 can then be moved past the hook portion 606 of the catch member 600 while the catch member 600 is held upwards by the user, to allow the lever mechanism to cross the centre position and the battery pack 52 to be released from the holder.

As shown in FIG. 24, when the user later wishes to secure the battery pack 52 into the holder again, the user can move the lever arm 124 from the second position towards the third position causing the lever arm 124 to contact a sloping surface 616 of the hook portion 606 of the catch member, so that the movement of the lever arm 124 by the user towards the third position automatically causes the catch member 600 to be temporarily displaced, allowing the lever arm 124 to pass the catch member 600 and reach the third position. This means that there is no need for the user to manually move the catch member 600 when securing the battery pack 52 into the holder 54, which improves ease of use. Once the lever arm 124 has passed the catch member 600, the bias provided by the spring 610 causes the catch member 600 to return to the catching position, so that the lever arm 124 is securely retained and the lever mechanism remains in the retained state.

Another advantage of the catch member 600 is that it provides a clear visual and audible indication of whether the lever arm 124 has reached the position in which the battery pack is securely retained. If the hook portion 606 of the catch member 600 is seen to be over the lever arm 124 then the battery pack will be securely retained. Also, the catch member 600 springing back into position after being displaced by the motion of the lever arm 124 may provide a clicking sound or other audible indication that can provide confirmation that the lever arm is positioned correctly for securely retaining the battery pack 52 in the holder 54. This means the user can more quickly check that the battery pack is secure, again improving ease of use.

Hence, providing a catch member 600 as shown can make it less likely that the battery holder will be misused by a user. Nevertheless, the earlier examples without the catching member 600 are also effective at retaining the battery pack securely, but may require more care by the user to ensure the lever arm is in the correct position before cycling.

Figure 25:
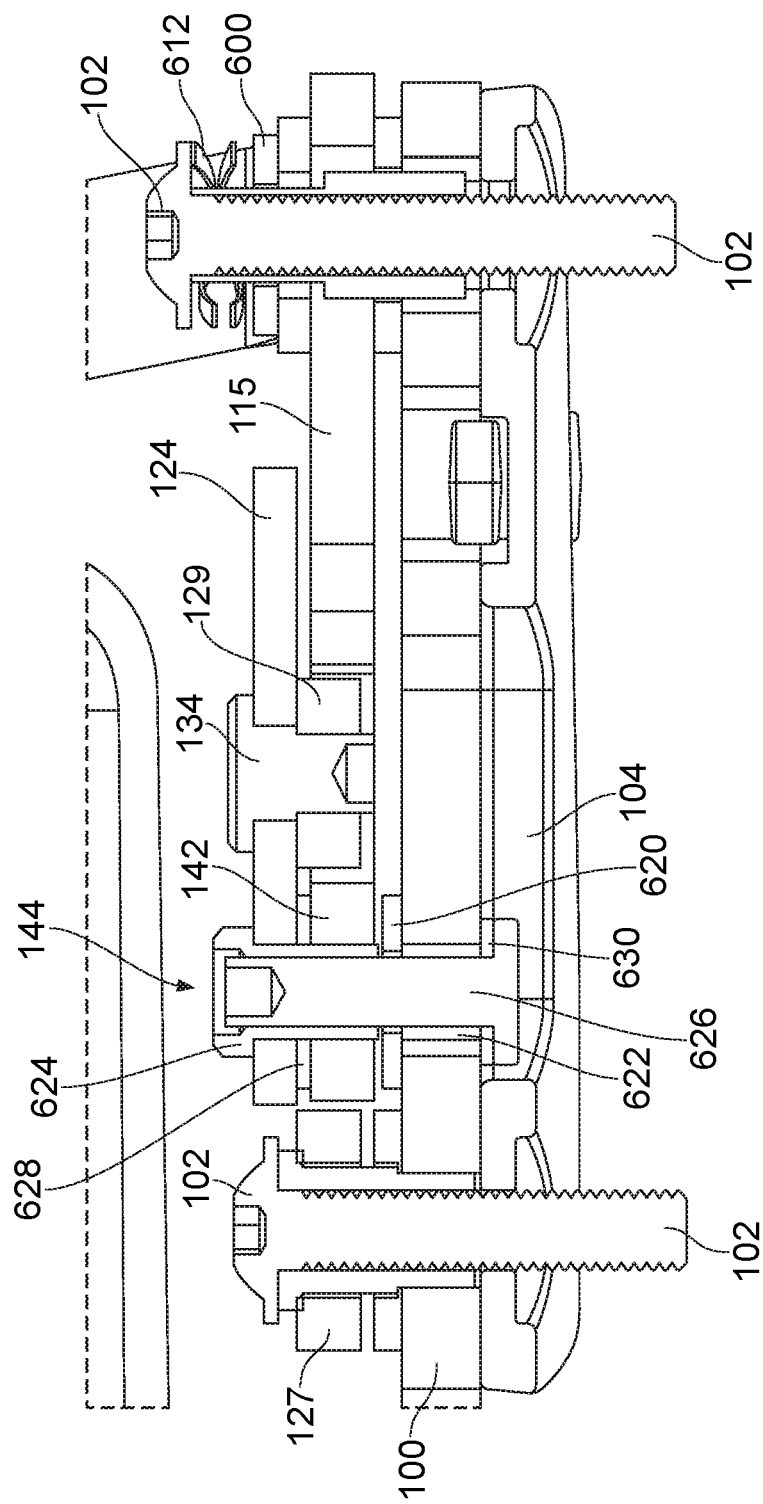
FIG. 25 shows a cross-section view illustrating an example implementation of fixings for the lever mechanism.

FIG. 25 is a cross section view showing an example implementation for the fixings for the lever mechanism. Although FIG. 25 shows the fixings in the context of the example of FIGS. 23 and 24 which has the catch member 600, it would also be possible to use similar fixings in the examples described earlier which do not have the catch member 600.

The fixing 144 at the third pivot axis (146 in earlier diagrams) comprises a rivet, instead of a threaded screw as in earlier examples. This avoids any need to use thread-locking fluid to prevent loosening of the fixing, which has the advantage that there is no risk of the thread-locking fluid leaking to other parts of the lever mechanism and resisting smooth motion of the lever mechanism. Similarly, the fixing 134 at the second pivot axis (labelled 136 in earlier diagrams) may also be formed using a rivet instead of a threaded screw. The bolts 102 are still provided as threaded bolts as they will secure the battery holder 54 to the threaded fixing holes in the cycle frame in this example, but as discussed above in other examples the fixing bolts for fixing the holder 54 to the frame could be positioned elsewhere, and in this case it may not be essential for the fixings at the positions of the bolts 102 to be threaded.

Rivet 144 comprises two parts: an upper sleeve 624 and a rivet pin 626. The rivet pin 626 extends into a recessed upper part of the upper sleeve 624 and is set into the upper sleeve 624 by flaring out the cylindrical part of the rivet pin 626 with a tapered tool, so that the two parts 624, 626 of the rivet 144 cannot come apart. A washer 620 may be provided around the rivet 144 between the upper end 142 of the battery moving portion 115 and the spine 100. Another washer 628 may be provided between the upper end 142 of the battery moving portion 115 and the lever arm 124.

Also, a washer 630 is provided under the head of the rivet pin 626, between the head of the rivet pin 626 and the spine 100. When in use, the washer 630 is under load and needs to slide up and down the spine 100. Also, a roller 622 may be provided around the portion of the rivet 144 which slides within the slot 150 of the spine 100. The washer 630 and roller 622 may be made of polytetrafluoroethylene (PTFE), Nylon, or other material with relatively low friction, to provide smoother motion of the lever mechanism.

Hence, at fixing 144 there are a number of parts that can rotate in relation to each other: the upper sleeve 624 can rotate in relation to the rivet 626 (depending on how the rivet is set), and the roller 622 can rotate in relation to the rivet pin 626. With two levels of potential rotation, the joint can therefore move freely even when dirty or another sticky substance enters the slot 150 in the spine 100.

Of course, it will be appreciated that other methods of fixing the moving parts of the lever mechanism together could be used.

Hence, in summary this battery holder design provides a design which can be fitted to a wide range of cycles of differing frame sizes and configurations, and can be used with a wide range of electrical components to be powered by the battery. A summary of some of the advantages that can be achieved by this design are as follows:

- neater cabling, as connector portion does not move and a hidden route is possible for the cabling, which can be completely hidden if used in a purpose-built cycle (by having simple cable hole(s) in the frame of a cycle near the top of the holder).
- can be used for neat cabling regardless of whether the motor is at the front or rear, or even with the motor in the crank or in the battery pack itself
- battery pack is clamped very easily with finger pressure on the lever, and no need for grip. No large lever advantage until the connector pins are engaged. E.g. on one example the lever advantage in terms of lateral movement is only about 2 until the pins engage, which is offset by the fact that the weight of the battery is being lifted with the lever, so little danger of damaging the connector. Once the pins are engaged, there is a larger lever advantage making it easy to clamp the battery pack into the holder.
- No extra support is required for the bottle after clamping as the connector does not move and is held rigidly, so no flexing occurs between the battery pack and the connector.
- Assembly with the cable loom (wiring for connecting to the cycle components to be powered) is easier, and it is possible to remove the cable loom for replacement/repair while leaving the battery holder installed on the cycle frame.
- One-lever action prevents battery pack coming undone. The lever arm is pushed to stop against part of the battery holder and then the lever mechanism cannot come undone. The user can confirm visually that the battery holder is securely fastened because it is apparent from whether the lever arm is resting against the stop—if the lever is sticking out (so the battery is not retained) then the user can easily see this. Once the lever mechanism passes through the centre position, the force on the lever mechanism tends to close the lever arm against the stop surface of the holder.
- Quick and easy to insert the battery pack, as connector alignment can be made precise, so no need to fiddle with rotational position of the battery or connector to get it into position
- Lever can be locked shut with a padlock to guard against opportunist theft.
- Easy to manufacture in a repeatable way. Main parts of battery holder can be produced at 90 degrees and flex can be achieved with rubber washers (e.g. between connector and top end of battery pack). Manufacturing variation in battery pack length can be absorbed by adding more or fewer rubber washers at top. As flex for clamping is provided by washers, no need to provide flex in cage itself, which would be harder to manufacture as it may require altering the angle and position of bends beyond 90 degrees after initial manufacture of the battery holder.

The lever mechanism 120 used in the battery holder 54 described above could also be used for clamping of objects other than a battery pack. Hence, an apparatus can be provided comprising a clamping portion 115 to clamp an object, and a lever mechanism 120 to actuate sliding of the clamping portion 115 in a linear direction between an open state in which the object can be removed and an engaged state in which the clamped object is held in position. The lever mechanism 120 has a retained state which provides resistance to removal of the object. The lever mechanism 120 may provide the retained state using an over-centre mechanism. The lever mechanism 120 may comprise a lever arm 124 configured to actuate sliding of the clamping portion 115 in response to movement of the lever arm 124. The lever arm may control entry into the retained state when the lever arm causes an element 134 of the lever mechanism to move past a centre position in response to movement, and when the lever mechanism is in the retained state, the lever mechanism is configured to resist movement of the element past the centre position until a force is applied to the lever arm to move the lever arm back towards the position in which the lever arm is positioned when the clamping portion is in the open state. The lever mechanism in this apparatus may have any of the features of the lever mechanism 120 described above for the battery holder 54.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. A battery holder for fitting a battery pack to a frame of a cycle, the battery holder comprising:
    a spine portion for fixing to the frame;
    a connector portion at one end of the spine portion, to form an electrical connection between the battery pack and wiring for connecting to at least one component of the cycle when the battery pack is held by the battery holder;
    a battery moving portion at the other end of the spine portion, for moving the battery pack towards the connector portion to engage the battery pack with the connector portion, the battery moving portion being slidable in a linear direction between an open state providing clearance for the battery pack to be inserted into or removed from the battery holder, and an engaged state in which the battery moving portion is closer to the connector portion than in the open state; and
    a lever mechanism to actuate sliding of the battery moving portion in a linear direction between the open state and the engaged state, the lever mechanism having a retained state which provides resistance to removal of the battery pack from the battery holder when the battery pack is held between the connector portion and the battery moving portion with the battery moving portion in the engaged state.

2. The battery holder according to claim 1, in which the connector portion is static relative to the spine portion of the battery holder.

3. The battery holder according to claim 1, in which the lever mechanism is configured to provide said retained state using an over-centre mechanism.

4. The battery holder according to claim 1, in which the lever mechanism comprises a lever arm configured to actuate sliding of the battery moving portion from the open state to the engaged state in response to movement of the lever arm from a first position to a second position.

5. The battery holder according to claim 4, in which when the battery moving portion is in the engaged state, the lever arm is configured to control entry into the retained state in response to continued movement of the lever arm from the second position to a third position.

6. The battery holder according to claim 5, in which the lever mechanism comprises an element which is configured to move past a centre position in response to movement of the lever arm between the second position and the third position, and
when the lever arm is in the third position, the lever mechanism is configured to resist movement of the element past the centre position until a force is applied to the lever arm to move the lever arm from the third position towards the second position.

7. The battery holder according to claim 6, in which when the element is at the centre position, there is a gap between an end surface of the element and an opposing surface of another part of the lever mechanism which the end surface moves past as the lever arm moves between the second position and the third position.

8. The battery holder according to claim 5, in which when the lever arm is in the third position, a part of the lever mechanism abuts against a stop surface.

9. The battery holder according to claim 1, in which the lever mechanism comprises a lever arm configured to control entry to the retained state and exit from the retained state; and
the battery holder comprises a catch member configured, when in a catching position, to resist displacement of the lever arm when the lever mechanism is in the retained state.

10. The battery holder according to claim 9, wherein the catch member has a surface configured to be contacted by the lever arm as the lever arm moves towards a position in which the lever mechanism is in the retained state, to cause the catch member to be temporarily displaced allowing the lever arm to pass the catch member; and
the catch member is biased to return to the catching position once the lever arm has passed the catch member.

11. The battery holder according to claim 1, in which the lever mechanism comprises a connecting arm and a lever arm;
a first end of the connecting arm is coupled to the spine portion by a first pivot;
a second end of the connecting arm is coupled to an intermediate point of the lever arm by a second pivot;
one end of the lever arm is coupled to a part of the battery moving portion by a third pivot, where the third pivot is configured to slide along the spine portion with an axis of the third pivot tracing out a plane; and
when the lever mechanism is in the retained state, the second pivot is on an opposite side of the plane traced out by the axis of the third pivot, compared to the side of the plane at which the second pivot is positioned when the battery moving portion is in the open state.

12. The battery holder according to claim 11, in which said part of the battery moving portion comprises a looping portion of the battery moving portion which includes an indent positioned between the third pivot and a part of the battery moving portion for engaging with the battery pack; and
the indent is shaped to receive the second end of the connecting arm when the lever mechanism is in the retained state.

13. The battery holder according to claim 11, in which the spine portion comprises a guide groove, and the third pivot is slidable within the guide groove.

14. The battery holder according to claim 11, in which the battery moving portion is coupled to the spine portion by a fixing at a position further from the connector portion than the third pivot, where the fixing is slidable within a second guide groove which is provided on one of the battery moving portion and the spine portion.

15. The battery holder according to claim 1, comprising at least one compressible element made of deformable material and configured to be compressed when the battery pack is engaged with the connector portion and the battery moving portion is in the engaged state.

16. The battery holder according to claim 15, in which the at least one compressible element comprises at least one of:
at least one washer configured to be compressed between the connector portion and another portion of the battery holder;
at least one washer configured to be compressed between the battery pack and the connector portion when the battery pack is engaged with the connector portion; and
a compressible portion of the battery moving portion.

17. The battery holder according to claim 1, in which the battery moving portion comprises at least one battery engaging hook having a curved surface permitting the battery pack to be inserted onto the at least one battery engaging hook in an angled position when the battery moving portion is in the open state and then, while the battery pack remains engaged with the at least one engaging hook, tilted from the angled position into an aligned position ready for engagement with the connector portion.

18. The battery holder according to claim 1, further comprising the battery pack.

19. A cycle fitted with the battery holder according to claim 1.

20. An electrically assisted cycle kit for retrofitting to a cycle, the kit comprising the battery holder according to claim 1.

* * * * *